US012792126B2

(12) United States Patent
Gemma

(10) Patent No.: US 12,792,126 B2
(45) Date of Patent: Nov. 10, 2026

(54) SEMICONDUCTOR DEVICE, TIME MEASUREMENT METHOD AND TIME MEASUREMENT PROGRAM

(71) Applicant: Renesas Electronics Corporation, Tokyo (JP)

(72) Inventor: Kazuaki Gemma, Tokyo (JP)

(73) Assignee: Renesas Electronics Corporation, Tokyo (JP)

( * ) Notice: Subject to any disclaimer, the term of this patent is extended or adjusted under 35 U.S.C. 154(b) by 295 days.

(21) Appl. No.: 18/594,672

(22) Filed: Mar. 4, 2024

(65) Prior Publication Data

US 2024/0329717 A1 Oct. 3, 2024

(30) Foreign Application Priority Data

Mar. 31, 2023 (JP) ................................ 2023-057253

(51) Int. Cl.

*G06F 1/12* (2006.01)
*G06F 1/08* (2006.01)
*G06F 1/324* (2019.01)

(52) U.S. Cl.

CPC ................ *G06F 1/324* (2013.01); *G06F 1/08* (2013.01); *G06F 1/12* (2013.01)

(58) Field of Classification Search

CPC ................. G06F 1/32; G06F 1/08; G06F 1/12
See application file for complete search history.

(56) References Cited

U.S. PATENT DOCUMENTS

| | | | | |
|---|---|---|---|---|
| 5,471,631 | A * | 11/1995 | Beardsley | G06F 11/0745 713/502 |
| 2011/0145500 | A1* | 6/2011 | Miura | G06F 13/1689 711/E12.001 |
| 2023/0095243 | A1* | 3/2023 | Numata | H04N 25/10 348/308 |
| 2024/0211895 | A1* | 6/2024 | Xie | G06Q 10/1097 |
| 2025/0355692 | A1* | 11/2025 | Wasko | G06F 9/45558 |

OTHER PUBLICATIONS

"RX660 group user's manual, hardware edition", Mar. 2022, available at https://www.renesas.com/us/en/document/mah/rx660-group-users-manual-hardware?r=1618106.

* cited by examiner

*Primary Examiner* — Phil K Nguyen
(74) *Attorney, Agent, or Firm* — Rimon P.C.

(57) ABSTRACT

According to one embodiment, a semiconductor device includes an arithmetic processing unit, a plurality of peripheral circuits which are controlled by the arithmetic processing unit, a timing management circuit which outputs a result of time measurement executed according to a request for the time measurement from each of the peripheral circuits to the peripheral circuit, and the timing management circuit executes the time measurement according to each request for the time measurement.

18 Claims, 27 Drawing Sheets

101

2

SEMICONDUCTOR DEVICE, TIME MEASUREMENT METHOD AND TIME MEASUREMENT PROGRAM

CROSS-REFERENCE TO RELATED APPLICATIONS

The disclosure of Japanese Patent Application No. 2023-057253 filed on Mar. 31, 2023 including the specification, drawings and abstract is incorporated herein by reference in its entirety.

BACKGROUND

The present disclosure relates to a semiconductor device, a time measurement method, and a time measurement program.

There is disclosed a technique listed below.

[Non-Patent Document 1] "RX660 group user's manual, hardware edition", [online], March 2022, [searched on Feb. 24, 2023] https://www.renesas.com/jp/ja/document/mah/rx660-group-users-manual-hardware?r=1618106 on the Internet Non-Patent Document 1 discloses a block diagram of hardware included in a microcomputer.

SUMMARY

A micro controller unit (MCU) includes a clock generation circuit, a timer, a communication internet protocol (IP), and the like. The clock generation circuit has an oscillation stabilization waiting circuit configured to wait for stabilization of oscillation of an oscillator. The oscillation stabilization waiting circuit has a function of measuring a period of time taken for stabilization of oscillation of the oscillator. A plurality of peripheral circuits such as the timer and the communication IP each have a function of performing time measurement. Each circuit can execute time measurement at the same time, according to a time measurement function of each circuit.

When the plurality of circuits in the MCU execute time measurement at the same time, consumption current increases. In addition, when a large number of circuits are each supplied with a clock signal for time measurement, consumption current in association with a clock operation also increases.

Other objects and novel features will become apparent from the description of the present specification and the accompanied drawings.

According to one embodiment, a semiconductor device including: an arithmetic processing unit; a plurality of peripheral circuits which are controlled by the arithmetic processing unit; and a timing management circuit which outputs a result of time measurement executed according to a request for the time measurement from each of the peripheral circuits to the peripheral circuit, in which the timing management circuit executes the time measurement according to each request for the time measurement.

According to one embodiment, a time measurement method in a semiconductor device includes an arithmetic processing unit, a plurality of peripheral circuits which are controlled by the arithmetic processing unit, a timing management circuit which outputs a result of time measurement executed according to a request for the time measurement from each of the peripheral circuits to the peripheral circuit, the method including: causing the timing management circuit to execute the time measurement according to each request for the time measurement.

According to one embodiment, a time measurement program in a semiconductor device includes an arithmetic processing unit, a plurality of peripheral circuits which are controlled by the arithmetic processing unit, and a timing management circuit which outputs a result of time measurement executed according to a request for the time measurement from each of the peripheral circuits to the peripheral circuit, the program causing a computer to execute: causing the timing management circuit to execute the time measurement according to each request for the time measurement.

According to the one embodiment, it is possible to provide a semiconductor device, a time measurement method, and a time measurement program which are able to reduce consumption current.

DETAILED DESCRIPTION

For clarification of explanation, the following description and drawings are omitted and simplified appropriately. In addition, in each figure, components having the same function are denoted by the same reference symbols, and the repetitive description thereof is omitted as needed.

First, in COMPARATIVE EXAMPLE, a semiconductor device according to the comparative example will be described. Then, in PROBLEM NEWLY FOUND BY PRESENT INVENTOR, with respect to the semiconductor device according to the comparative example, a problem newly found by the present inventor will be described. Then, in FIRST EMBODIMENT, a semiconductor device according to the first embodiment will be described. Note that, also in FIRST EMBODIMENT, in order to clarify features of the semiconductor device according to the first embodiment, the semiconductor device according to the first embodiment will be compared with the semiconductor device according to the comparative example appropriately.

Comparative Example

Figure 1:
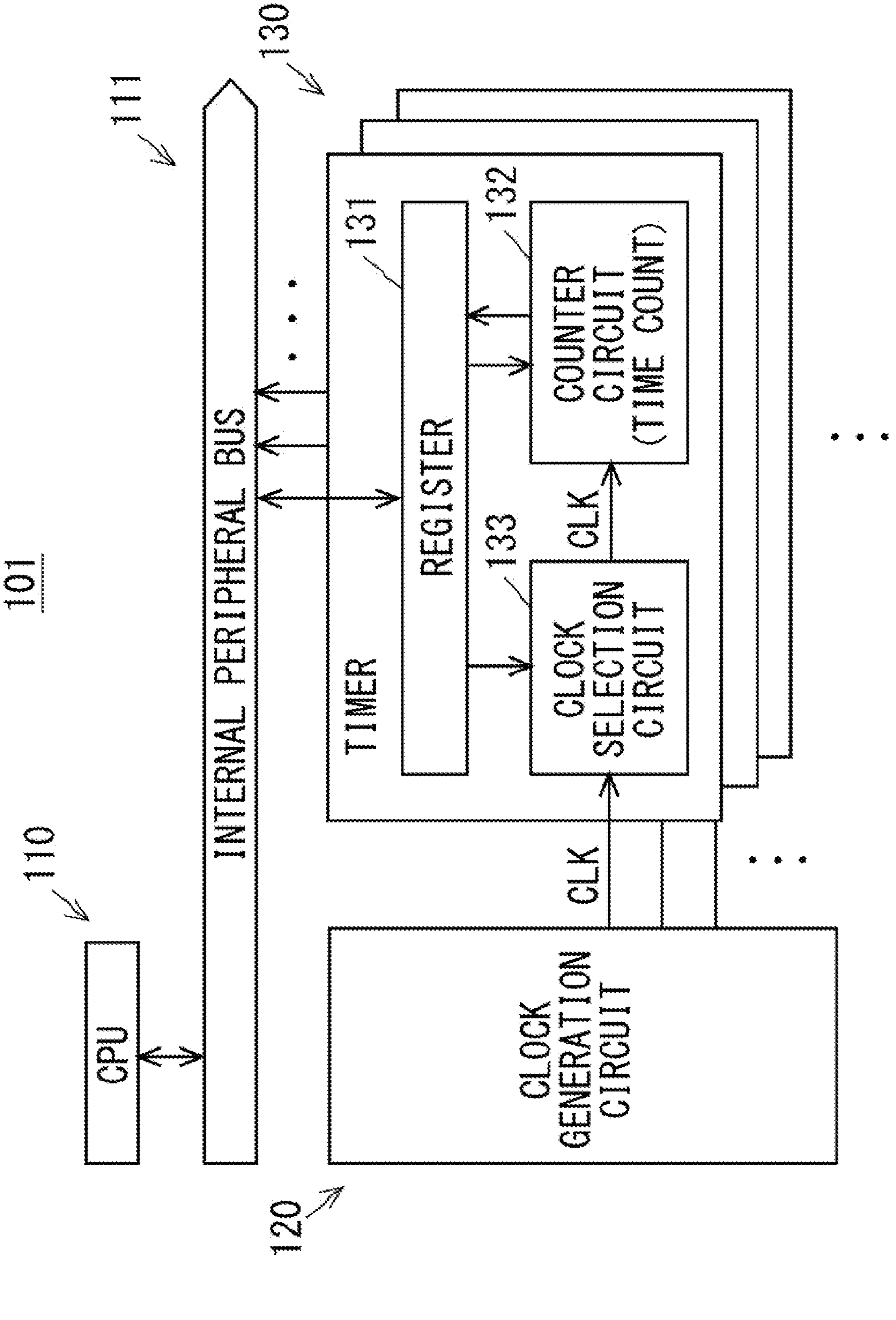
FIG. 1 is a block diagram illustrating a semiconductor device according to a comparative example.
Figure 2:
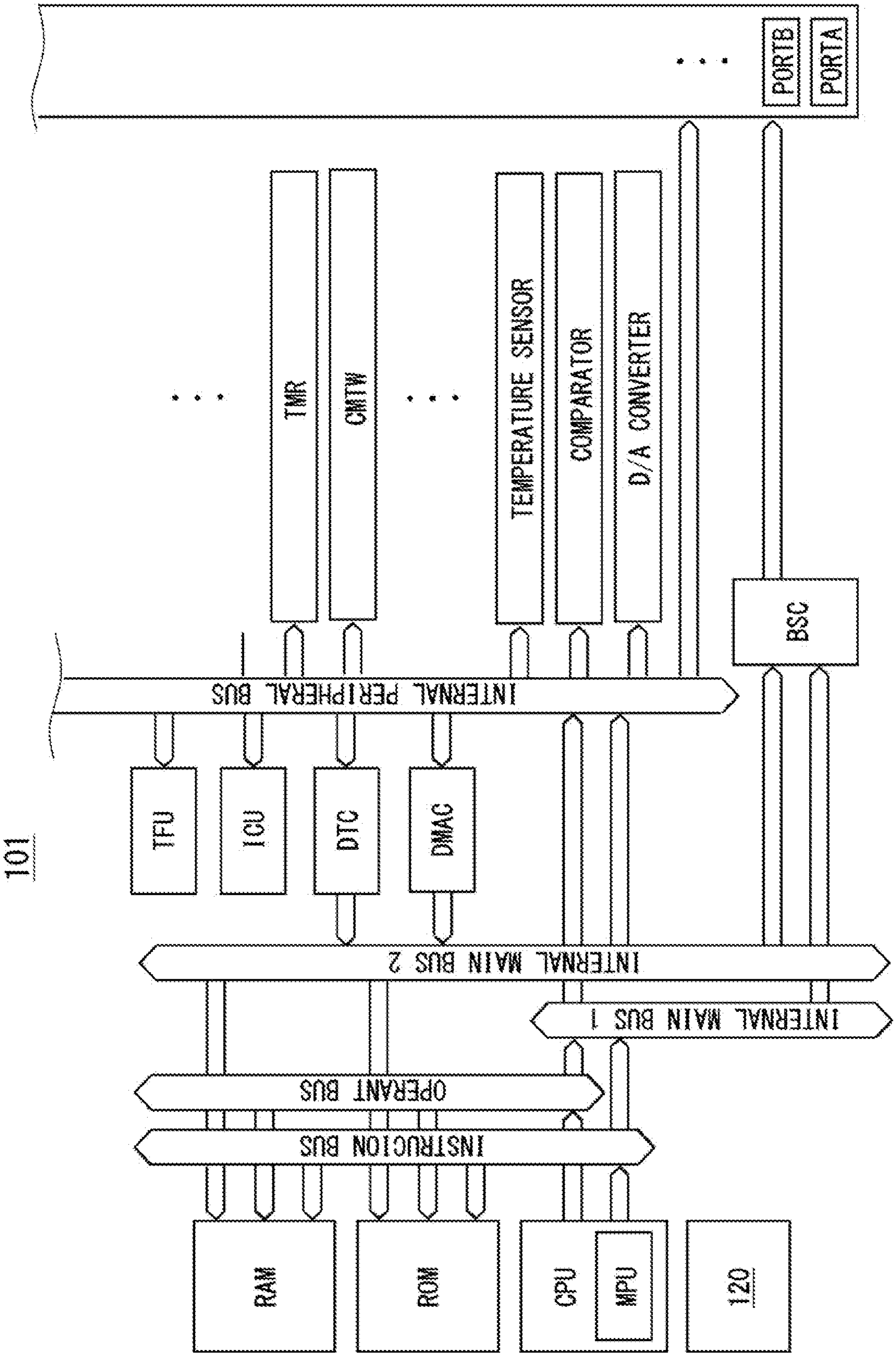
FIG. 2 is a block diagram illustrating the semiconductor device according to the comparative example.

The semiconductor device according to the comparative example will be described. FIG. 1 and FIG. 2 are block diagrams illustrating the semiconductor device according to the comparative example. FIG. 1 is a block diagram obtained by extracting some of main sections of FIG. 2 by way of example. As illustrated in FIG. 1, a semiconductor device 101 in the comparative example includes an arithmetic processing unit 110, an internal peripheral bus 111, a clock generation circuit 120, and a plurality of timers 130. The timer 130 has a register 131, a counter circuit 132, and a clock selection circuit 133. Note that such names as "CPU," "INTERNAL PERIPHERAL BUS," "TIMER," and "CLOCK GENERATION CIRCUIT" indicated in the drawings are merely examples and are not limited to them.

The arithmetic processing unit 110 is, for example, a central processing unit (CPU). Note that the arithmetic processing unit 110 is not limited to a CPU but may be a micro processor unit (MPU) or the like, as long as it performs control of other devices and circuits in the semiconductor device 101 and arithmetic processing on data or the like. The arithmetic processing unit 110 is connected to the internal peripheral bus 111 in a state in which information can be transmitted with each other.

The clock generation circuit 120 generates a clock signal CLK. The clock signal CLK may include, for example, a signal which periodically repeats a high voltage state and a low voltage state. The clock generation circuit 120 supplies the generated clock signals CLK to the plurality of timers 130.

The timer 130 is connected to the internal peripheral bus 111 in a state in which information can be transmitted. For example, the register 131 of each of the plurality of timers 130 is connected to the internal peripheral bus 111 in a state in which information can be transmitted. The register 131 controls the counter circuit 132 and the clock selection circuit 133.

The counter circuit 132 executes time measurement with use of the clock signal CLK. For example, the counter circuit 132 counts the number of high voltage states or low voltage states of the clock signal CLK, to thereby execute time measurement. The counter circuit 132 outputs the count number obtained by counting the number of high voltage states or low voltage states of the clock signal CLK as a result of the time measurement, to the register 131.

The clock selection circuit 133 receives the clock signals CLK from the clock generation circuit 120. The clock selection circuit 133 selects a predetermined clock signal CLK from the received clock signals CLK. The clock selection circuit 133 selects the predetermined clock signal CLK according to control by the register 131. The clock selection circuit 133 supplies the selected clock signal CLK to the counter circuit 132. The clock selection circuit 133 may control generation of the clock signal CLK in the clock generation circuit 120.

As illustrated in FIG. 2, the semiconductor device 101 may include an arithmetic processing unit CPU, an arithmetic processing unit MPU, the clock generation circuit 120, a storage device ROM, a storage device RAM, a trigonometric function unit TFU, an interrupt controller ICU, a data transfer controller DTC, a DMA controller DMAC, and a bus controller BSC. In addition, the semiconductor device 101 may include circuits such as a timer TMR, a compare match timer CMTW, a temperature sensor (TEMPERATURE SENSOR), a comparator (COMPARATOR), and a D/A converter (CONVERTER). Each circuit may be connected to a bus such as an instruction bus (INSTRUCTION BUS), an operant bus (OPERANT BUS), an internal main bus (INTERNAL MAIN BUS1 and BUS2), and an internal peripheral bus (INTERNAL PERIPHERAL BUS) in a state in which information can be transmitted.

Figure 3:
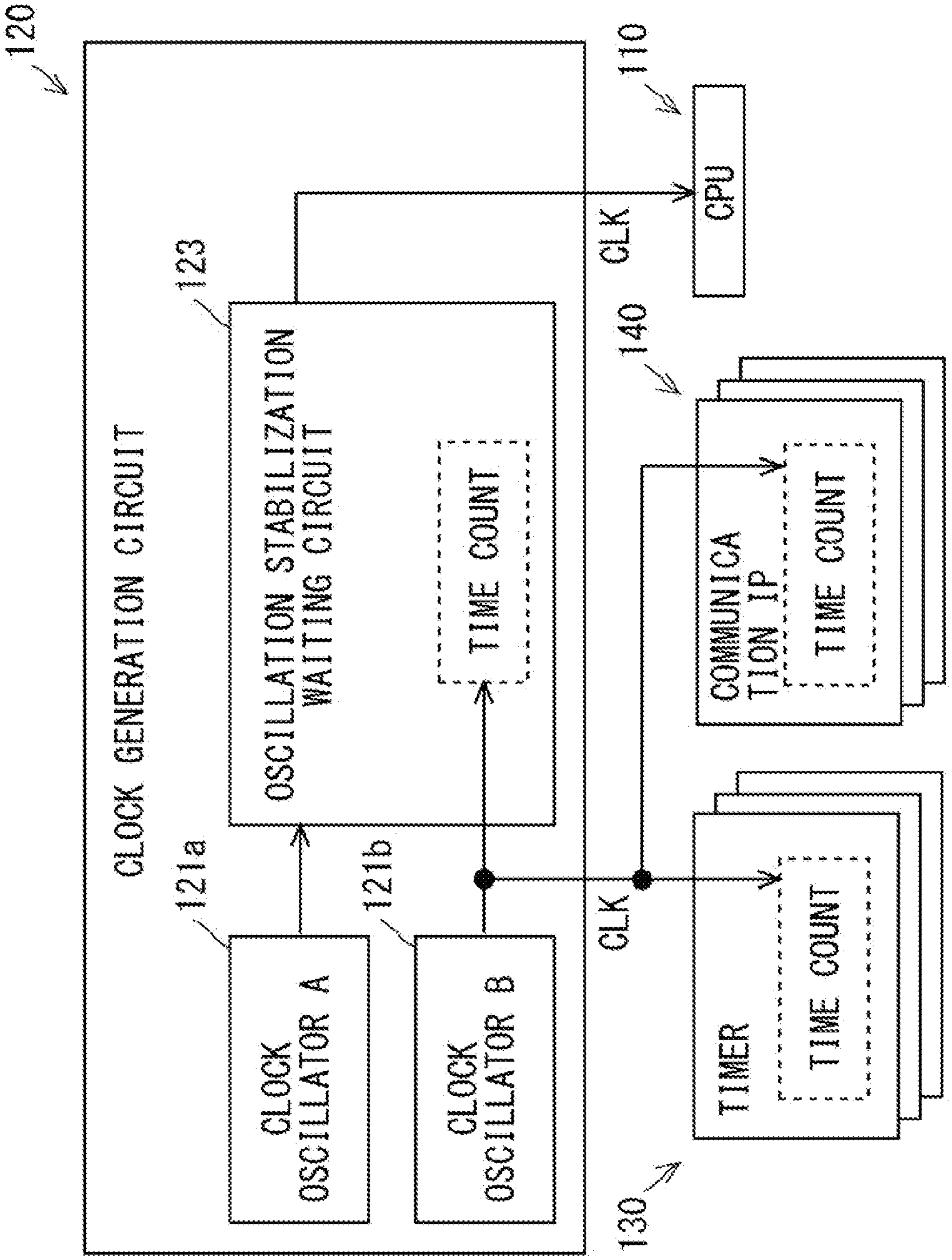
FIG. 3 is a block diagram illustrating an arithmetic processing unit, a clock generation circuit, a timer, and a communication IP in the semiconductor device according to the comparative example.

FIG. 3 is a block diagram illustrating the arithmetic processing unit 110, the clock generation circuit 120, a timer 130, and a communication IP 140, in the semiconductor device 101 according to the comparative example. As illustrated in FIG. 3, the semiconductor device 101 may include, in addition to the arithmetic processing unit 110, the clock generation circuit 120, and a plurality of timers 130, a plurality of communication IPs 140. In addition, the semiconductor device 101 may include an MCU, for example.

The clock generation circuit 120 may include a clock oscillator A121*a*, a clock oscillator B121*b*, and an oscillation stabilization waiting circuit 123. The oscillation stabilization waiting circuit 123 has a function of waiting for stabilization of oscillation of the clock oscillator A121*a* and the clock oscillator B121*b*. The oscillation stabilization waiting circuit 123 has a function of measuring a period of time taken for stabilization of oscillation of the clock oscillator A121*a* and the clock oscillator B121*b*.

Problem Newly Found by Present Inventor

The plurality of peripheral circuits such as the timers 130 and the communication IPs 140 each have a function of executing time measurement. Accordingly, the circuits such as the oscillation stabilization waiting circuit 123, the timers 130, and the communication IPs 140 execute can time measurement simultaneously according respective of to functions time measurement. With these configurations, the semiconductor device 101 can improve a degree of freedom in parallel operation. However, when time measurements in the circuits in the semiconductor device 101 are operated simultaneously, consumption current increases. In addition, when the number of circuits to which the clock signals CLK are supplied for executing time measurement becomes large, consumption current in association with the clock operations increases as well.

In recent years, along with a request for a long-term operation with use of a battery or an additional function to an MCU, the semiconductor device 101 has been demanded to further reduce power consumption. In the following embodiment, optimizing circuits which execute redundant time measurement reduces consumption current.

First Embodiment

Next, a semiconductor device according to the first embodiment will be described. The semiconductor device according to the first embodiment has a circuit which intensively executes time measurement in an MCU, for example. In addition, the semiconductor device according to the first embodiment has an interface which receives a request for time measurement from a peripheral circuit such as a timer and a communication IP and which provides a response of a result of the time measurement to the peripheral circuits. In the following embodiment, such a circuit is referred to as a timing management circuit.

Figure 4:
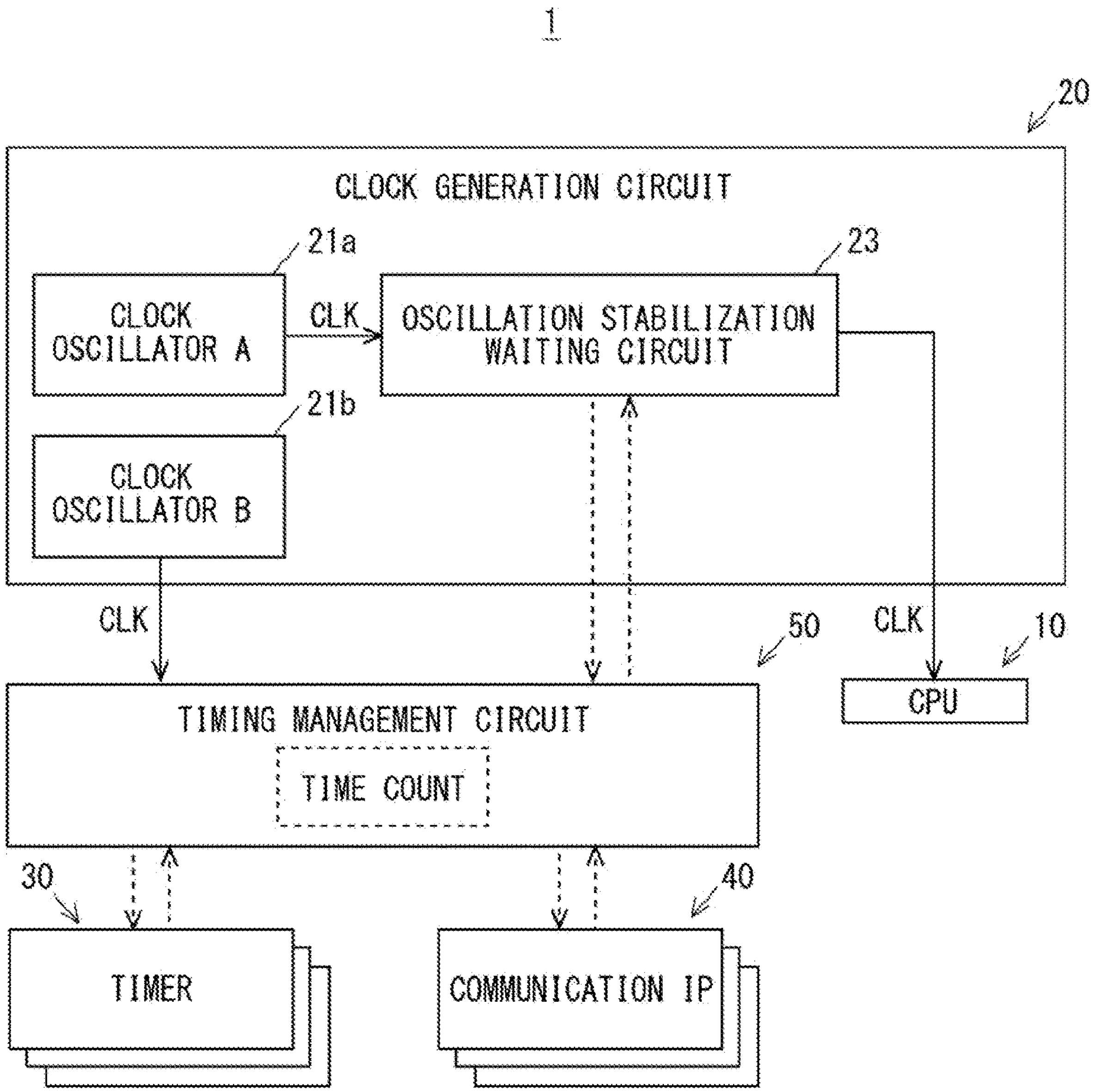
FIG. 4 is a block diagram illustrating a semiconductor device according to a first embodiment.

FIG. 4 is a block diagram illustrating a semiconductor device 1 according to the first embodiment. As illustrated in FIG. 4, the semiconductor device 1 includes an arithmetic processing unit 10, a clock generation circuit 20, a timer 30, a communication IP 40, and a timing management circuit 50. The clock generation circuit 20 may have a clock oscillator A21*a*, a clock oscillator B21*b*, and an oscillation stabilization waiting circuit 23. The timing management circuit 50 has a function of executing time measurement. The semiconductor device 1 may include a plurality of peripheral circuits other than the timer 30, the communication IP 40, and the like. The plurality of peripheral circuits are controlled by the arithmetic processing unit 10.

The clock generation circuit 20 generates a clock signal CLK that becomes a reference for time measurement in the timing management circuit 50. The clock signal CLK generated from the clock oscillator A21*a* in the clock generation circuit 20 may be supplied to the arithmetic processing unit 10 through the oscillation stabilization waiting circuit 23. The clock signal CLK generated from the clock oscillator B21*b* may be supplied to the timing management circuit 50.

The timing management circuit 50 is connected to the clock generation circuit 20 in a state that information can be transmitted. Specifically, the timing management circuit 50 is connected to the oscillation stabilization waiting circuit 23 in a state that information can be transmitted. The timing management circuit 50 may be connected to the peripheral circuits including the plurality of timers 30 and the plurality of communication IPs 40 in a state that information can be transmitted.

The timing management circuit 50 controls the oscillation stabilization waiting circuit 23, and the oscillation stabilization waiting circuit 23 controls the timing management circuit 50. For example, the oscillation stabilization waiting circuit 23 makes a request for time measurement to the timing management circuit 50. Meanwhile, the timing management circuit 50 outputs a result of the time measurement to the oscillation stabilization waiting circuit 23.

In addition, the timing management circuit 50 controls the plurality of peripheral circuits including the plurality of timers 30 and the plurality of communication IPs 40, and the plurality of peripheral circuits each control the timing management circuit 50. For example, the peripheral circuits such as the timers 30 and the communication IPs 40 each make a request for time measurement to the timing management circuit 50. Meanwhile, the timing management circuit 50 outputs a result of the time measurement executed according to the request for the time measurement from each of the peripheral circuits, to each of the peripheral circuits.

Thus, the timing management circuit 50 is in a relation being connected to various circuits requiring time measurement. The timing management circuit 50 has a function of measuring time with use of the clock signal CLK supplied. When the peripheral circuit requiring time measurement makes a start request for time measurement to the timing management circuit 50, the timing management circuit 50 notifies the relevant peripheral circuit of the completion of the time measurement after a given period of time. The timing management circuit 50 may output the result of the time measurement.

In a case in which a request for time measurement is received from each of the plurality of peripheral circuits, the timing management circuit 50 executes the time measurement according to each request for the time measurement. Specifically, when the timing management circuit 50 receives a first request for a first time measurement from any one of the plurality of peripheral circuits, the timing management circuit 50 starts the first time measurement. When the timing management circuit 50 receives a second request for a second time measurement during execution of the first time measurement, the timing management circuit 50 starts the second time measurement, continuing the first time measurement. The timing management circuit 50 may receive the second request from a peripheral circuit different from the peripheral circuit by which the first request has been made. Depending on a circumstance, the timing management circuit 50 may receive the second request from the peripheral circuit by which the first request has been made.

In addition, a time measurement method by the semiconductor device 1 according to the present embodiment includes a step of causing the timing management circuit 50 to execute time measurement according to each request for the time measurement. The step of causing the timing management circuit 50 to execute the time measurement includes a step of starting the first time measurement when the first request for the first time measurement is received from any one of the plurality of peripheral circuits, and a step of starting the second time measurement when the second request for the second time measurement is received during the execution of the first time measurement, continuing the first time measurement.

In a period of time in which time measurement is not necessary, the timing management circuit 50 stops the function of time measurement incorporated therein. Accordingly, the timing management circuit 50 receives a request for time measurement from each of the peripheral circuits, thereby executing the time measurement. Hence, after outputting all of results of the time measurement of the received requests, the timing management circuit 50 stops time measurement until it receives a next request for time measurement.

Figure 5:
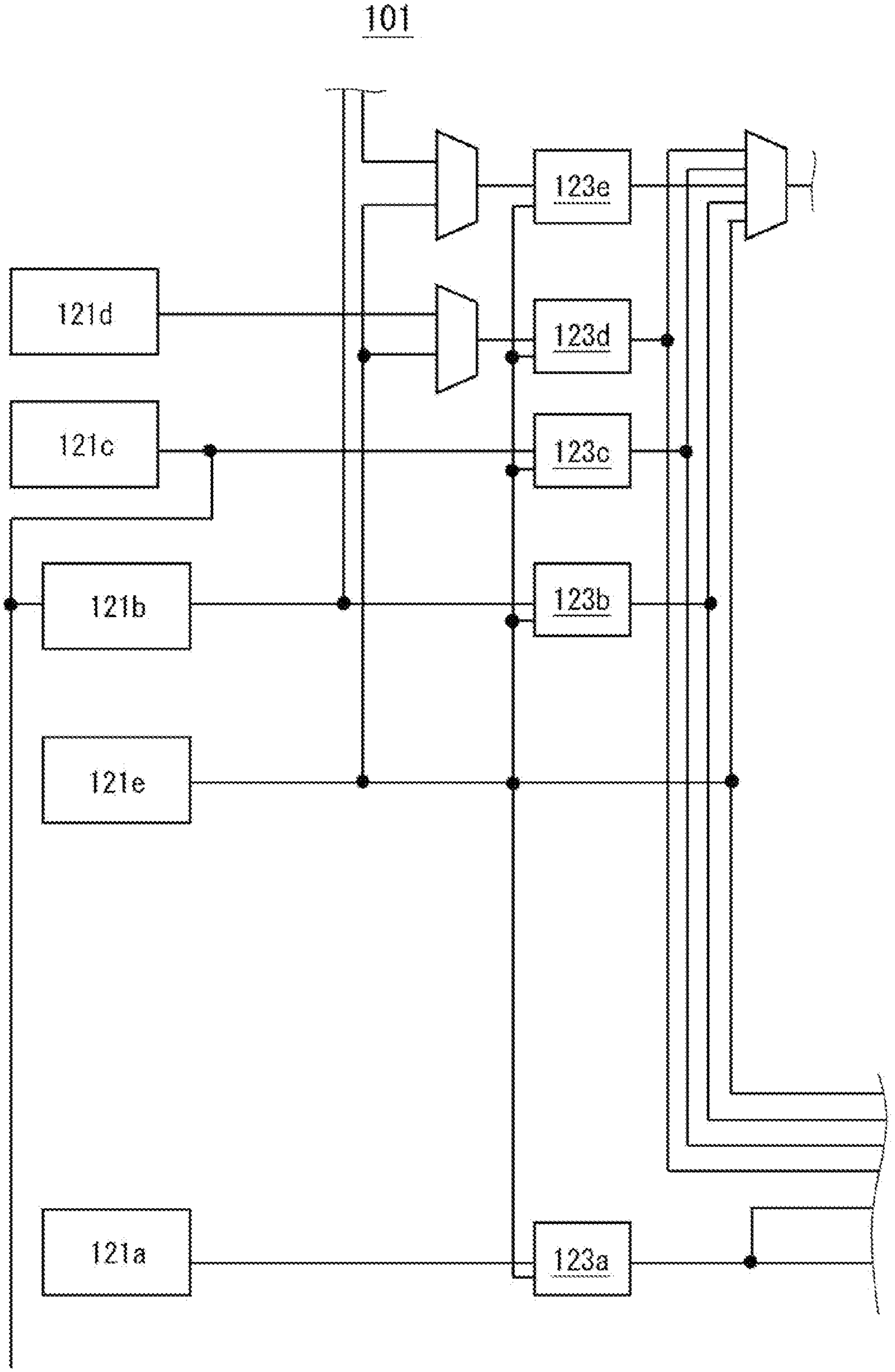
FIG. 5 is a block diagram illustrating an oscillation stabilization waiting circuits in the semiconductor device according to the comparative example.
Figure 6:
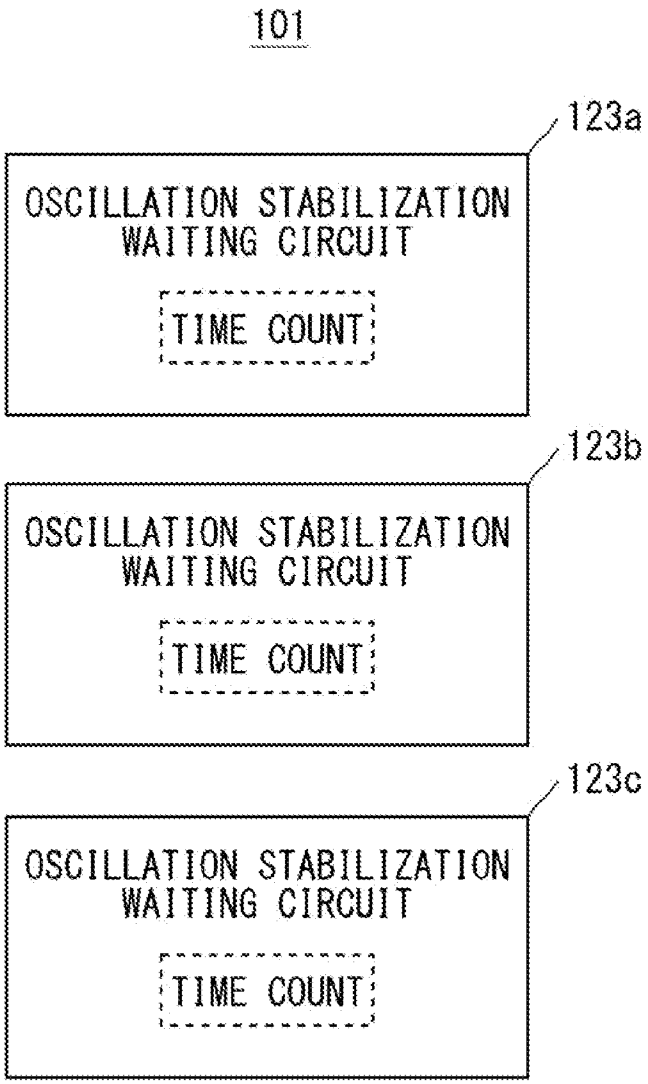
FIG. 6 is a block diagram illustrating the oscillation stabilization waiting circuits in the semiconductor device according to the comparative example.
Figure 7:
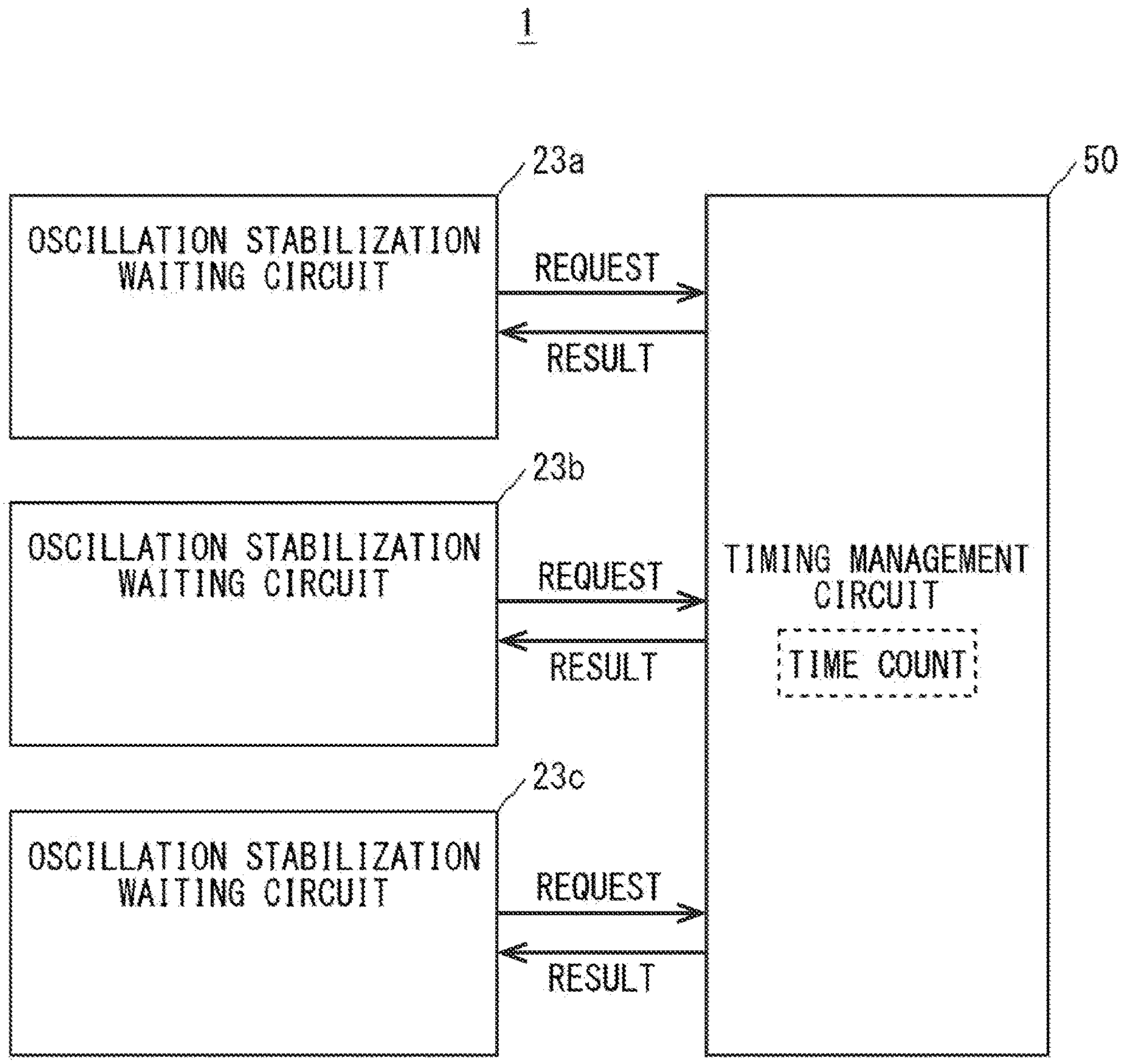
FIG. 7 is a block diagram illustrating oscillation stabilization waiting circuits and a timing management circuit in the semiconductor device according to the first embodiment.

FIG. 5 and FIG. 6 are block diagrams illustrating oscillation stabilization waiting circuits 123*a* to 123*e* in the semiconductor device 101 according to the comparative example. FIG. 6 is a block diagram obtained by extracting part of main sections of FIG. 5 as an example. FIG. 7 is a block diagram illustrating oscillation stabilization waiting circuits 23*a* to 23*c* and the timing management circuit 50 in the semiconductor device 1 according to the first embodiment.

As illustrated in FIG. 5 and FIG. 6, the semiconductor device 101 according to the comparative example includes not only the clock oscillator A121*a* and the clock oscillator B121*b*, but also the plurality of clock oscillators 121*c* to 121*e* and the oscillation stabilization waiting circuits 123*a* to 123*e* for each of a plurality of on-chip oscillators. Then, as illustrated in FIG. 6, each of the plurality of oscillation stabilization waiting circuits 123*a* to 123*c* has the function of executing time measurement. The function of executing time measurement may be carried out by a counter, for example.

Meanwhile, as illustrated in FIG. 7, in the semiconductor device 1 according to the present embodiment, the timing management circuit 50 has the function of the counter which executes time measurement. The semiconductor device 1 according to the present embodiment has the plurality of clock oscillators A21*a* and B21*b* as well as the oscillation stabilization waiting circuits 23*a* to 23*c* for each of the plurality of on-chip oscillators. When the clock oscillator A21*a*, the clock oscillator B21*b*, and a clock oscillator 21*c* start oscillation, the oscillation stabilization waiting circuits 23*a* to 23*c* each output a request for time measurement (REQUEST) to the timing management circuit 50. Also, the timing function of management circuit 50 has the executing time measurement. The timing management circuit 50 outputs a result of time measurement (RESULT) to a corresponding one of the oscillation stabilization waiting circuits 23*a* to 23*c*.

Figure 8:
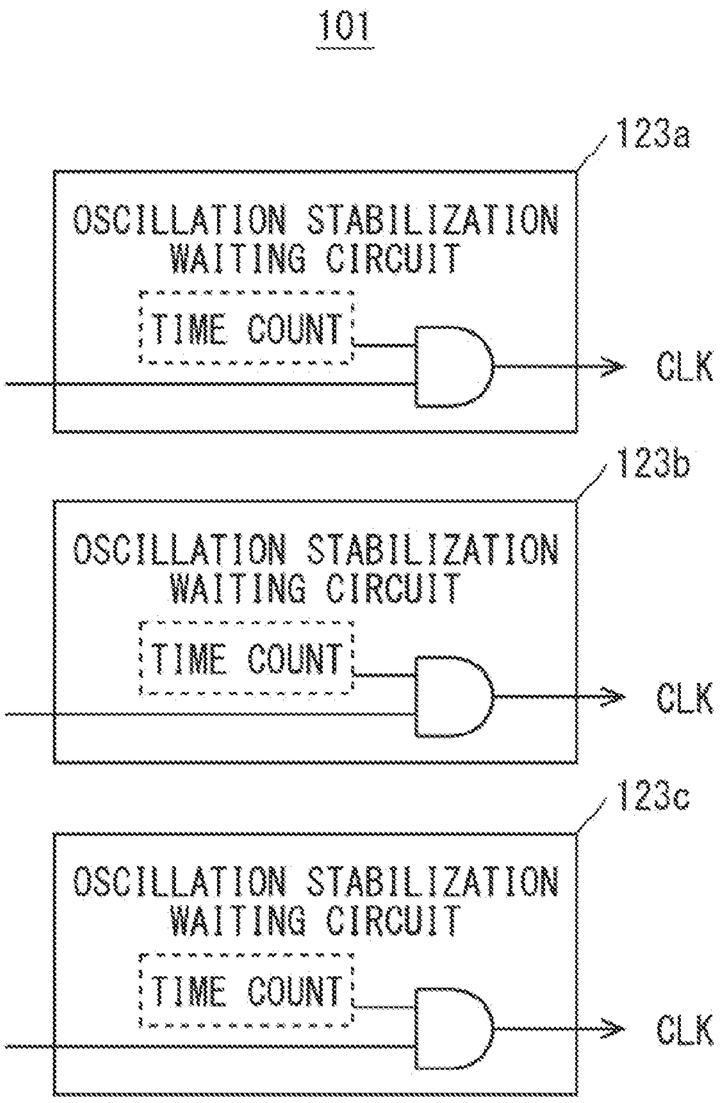
FIG. 8 is a block diagram illustrating a configuration of the oscillation stabilization waiting circuits in the semiconductor device according to the comparative example.
Figure 9:
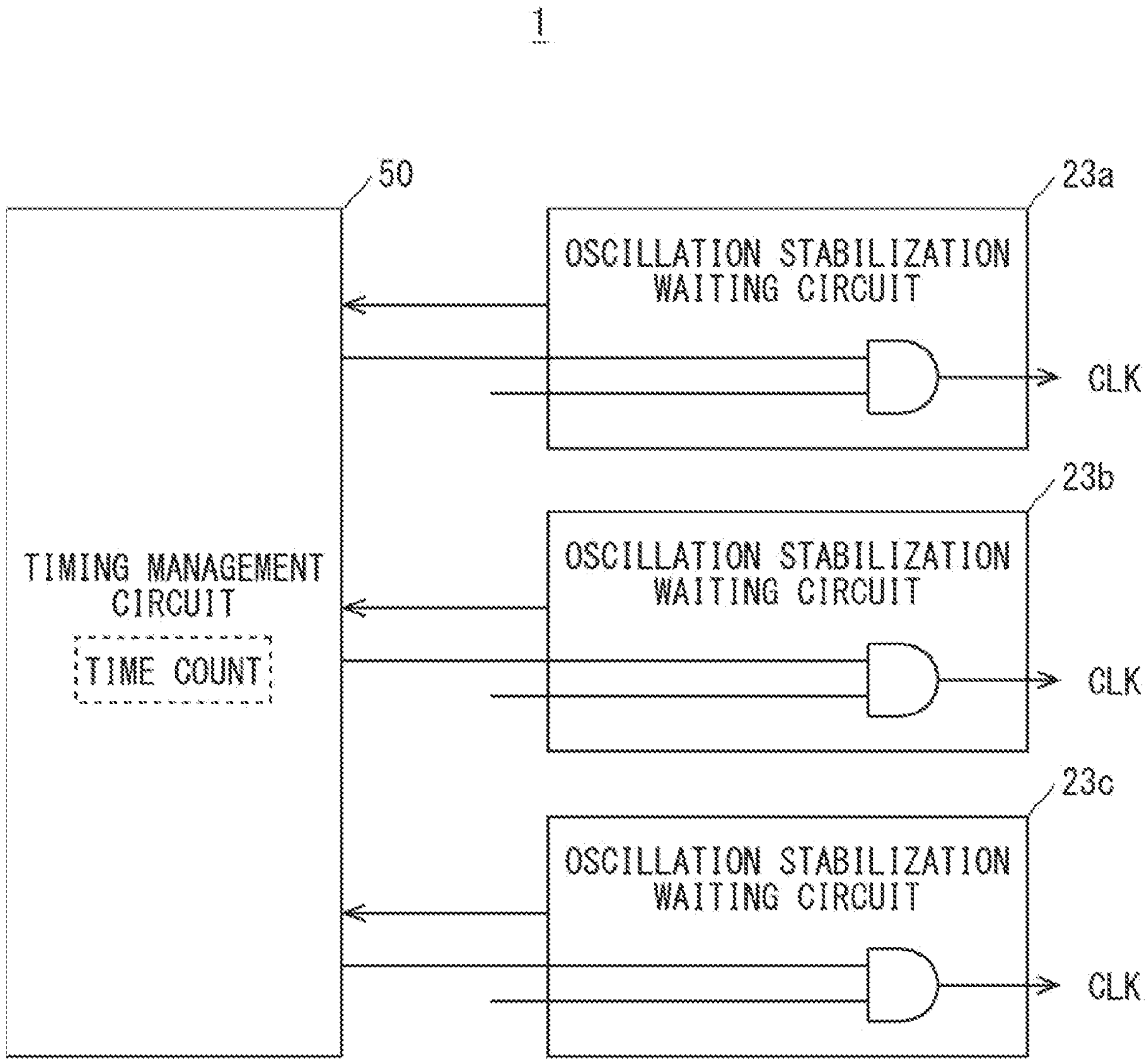
FIG. 9 is a block diagram illustrating a configuration of the oscillation stabilization waiting circuits and the timing management circuit in the semiconductor device according to the first embodiment.

FIG. 8 is a block diagram illustrating the oscillation stabilization waiting circuits 123*a* to 123*c*, in the semiconductor device 101 according to the comparative example. FIG. 9 is a block diagram illustrating the oscillation stabilization waiting circuits 23*a* to 23*c* and the timing management circuit 50 in the semiconductor device 1 according to the first embodiment.

As illustrated in FIG. 8, in the semiconductor device 101 according to the comparative example, each of the oscillation stabilization waiting circuits 123*a* to 123*c* may have the function of executing time measurement and a logic gate such as an AND gate. For example, in a case in which measured time matches with a predetermined stabilization waiting time, each of the oscillation stabilization waiting circuits 123*a* to 123*c* may output a clock signal CLK.

In contrast, as illustrated in FIG. 9, in the semiconductor device 1 according to the present embodiment, each of the oscillation stabilization waiting circuits 23*a* to 23*c* may have a logic gate such as an AND gate. Each of the oscillation stabilization waiting circuits 23*a* to 23*c* makes a request for time measurement to the timing management circuit 50. The timing management circuit 50 has the function of executing time measurement. The timing management circuit 50 outputs the result of the time measurement to each of the oscillation stabilization waiting circuits 23*a* to 23*c*. Each of the oscillation stabilization waiting circuits 23*a* to 23*c* outputs a clock signal CLK, in a case in which the measured time output by the timing management circuit 50 matches with a predetermined stabilization waiting time. Note that, in FIG. 8 and FIG. 9, the oscillation stabilization waiting circuits 123*a* to 123*c*, the oscillation stabilization waiting circuits 23*a* to 23*c*, and the timing management circuit 50 are simplified. In actual use, a complicated circuit for preventing clock hazard, for example, may additionally be provided.

Figure 10:
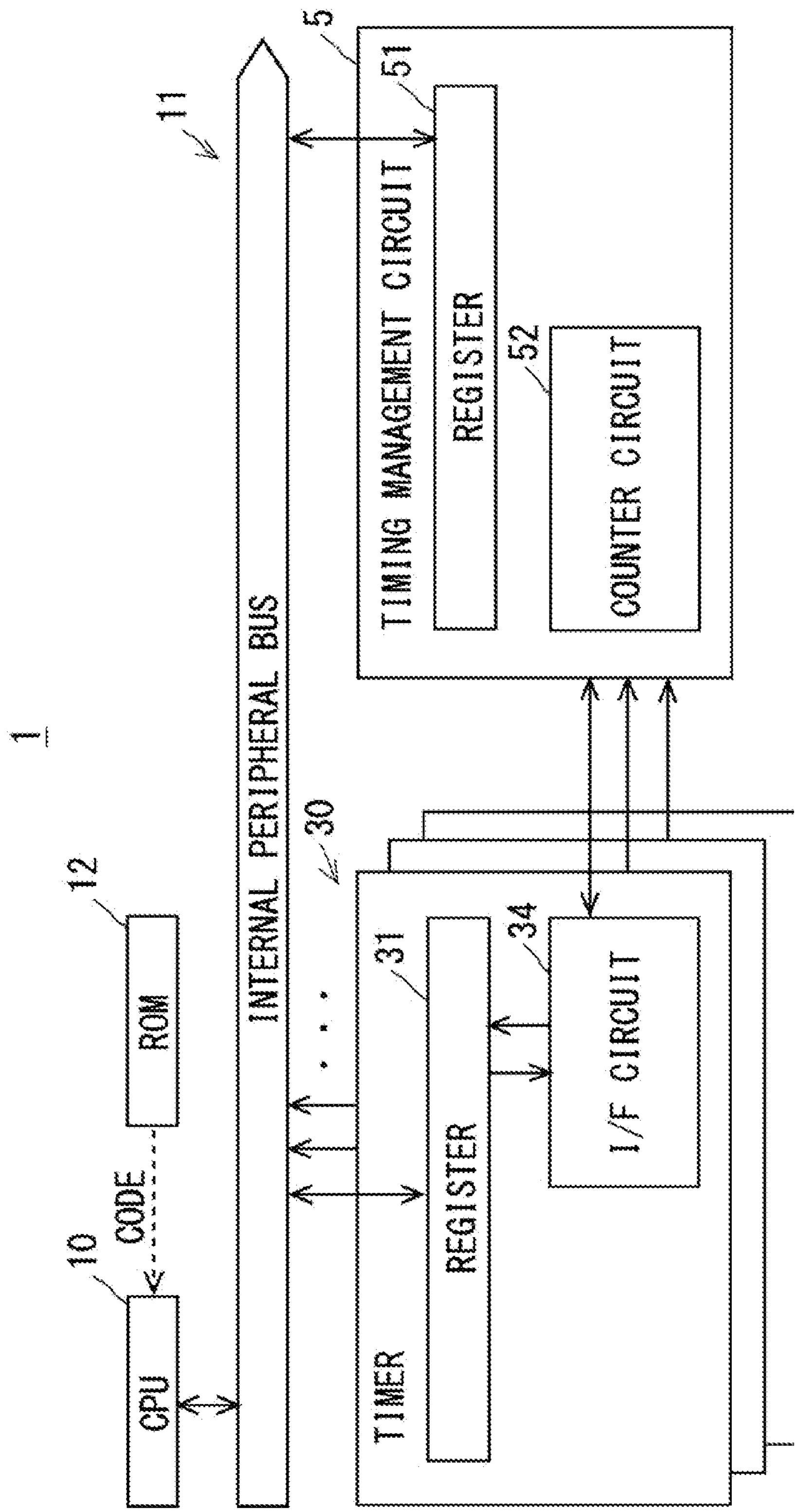
FIG. 10 is a block diagram illustrating the arithmetic processing unit, the storage device, the timer, and the timing management circuit in the semiconductor device according to the first embodiment.

FIG. 10 is a block diagram illustrating the arithmetic processing unit 10, a storage device 12, the timer 30, and the timing management circuit 50 in the semiconductor device 1 according to the first embodiment. As illustrated in FIG. 10, the semiconductor device 1 may further include not only the arithmetic processing unit 10, the timer 30, and the timing management circuit 50, but also the storage device 12. The timer 30 has a register 31 and an interface (I/F) circuit 34. The timing management circuit 50 has a register 51 and a counter circuit 52.

The storage device 12 stores an instruction code for controlling the arithmetic processing unit 10. For example, the storage device 12 may include a ROM (Read Only Memory). Note that the storage device 12 is not limited to the ROM but may be another storage device as long as it is a storage device which stores an instruction code for controlling the arithmetic processing unit 10. The storage device 12 outputs an instruction code to the arithmetic processing unit 10.

The arithmetic processing unit 10 is controlled by the instruction code stored in the storage device 12. The arithmetic processing unit 10 controls the timer 30 and the timing management circuit 50. Specifically, the arithmetic processing unit 10 writes the instruction code to the register 31 of the timer 30 to set an operation of the timer 30. In addition, the arithmetic processing unit 10 writes the instruction code to the register 51 of the timing management circuit 50 to set an operation of the timing management circuit 50.

The register 31 is connected to the internal peripheral bus 11 in a state in which information can be transmitted. The register 31 controls the operation of the timer 30 according to the written instruction code. The I/F circuit 34 is connected to the register 31 in a state in which information can be transmitted. In addition, the I/F circuit 34 is connected to the timing management circuit 50 in a state in which information can be transmitted. The timer 30 makes a request for time measurement through the I/F circuit 34 to the timing management circuit 50. In addition, the timer 30 receives a result of the time measurement through the I/F circuit 34 from the timing management circuit 50.

The register 51 is connected to the internal peripheral bus 11 in a state in which information can be transmitted. The register 51 controls the operation of the timing management circuit 50 according to the written instruction code. The counter circuit 52 executes the time measurement. The counter circuit 52 counts the number of high voltage states or low voltage states of the clock signal CLK, executing the time measurement. The timing management circuit 50 receives the request for the time measurement from the timer 30 to thereby execute the time measurement and output the result of the executed time measurement to the timer 30. The timing management circuit 50 may receive requests for time measurement from the plurality of timers 30.

Figure 11:
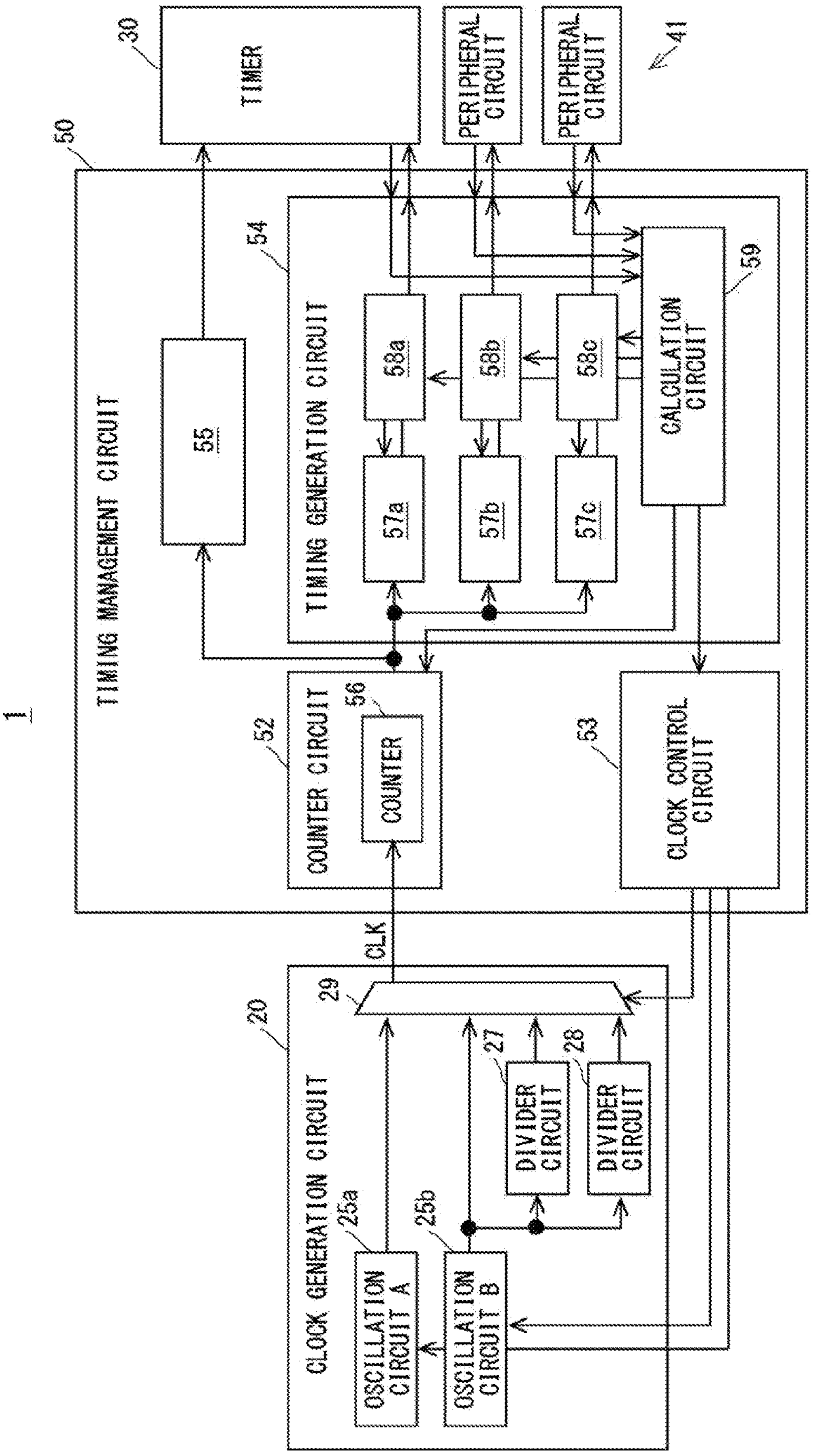
FIG. 11 is a block diagram illustrating the clock generation circuit, the timer, the peripheral circuit, and the timing management circuit in the semiconductor device according to the first embodiment.

FIG. 11 is a block diagram illustrating the clock generation circuit 20, the timer 30, a peripheral circuit 41, and the timing management circuit 50 in the semiconductor device 1 according to the first embodiment. The peripheral circuit 41 may include the timer 30 and the communication IP 40, for example. As illustrated in FIG. 11, the clock generation circuit 20 has an oscillation circuit A25*a*, an oscillation circuit B25*b*, a divider circuit 27, a divider circuit 28, and a selection circuit 29.

The timing management circuit 50 has the counter circuit 52, a clock control circuit 53, a timing generation circuit 54, and a counter value converter 55. The counter circuit 52 has a counter 56. The timing generation circuit 54 has a comparator 57*a*, a comparator 57*b*, a comparator 57*c*, a storage unit 58*a*, a storage unit 58*b*, a storage unit 58*c*, and a calculation circuit 59.

The oscillation circuit A25*a* generates a clock signal CLK. The oscillation circuit A25*a* may include the clock oscillator A21*a*. The oscillation circuit A25*a* outputs the generated clock signal CLK to the selection circuit 29. The oscillation circuit A25*a* may generate the clock signal CLK according to control by the clock control circuit 53 to output the generated clock signal CLK to the selection circuit 29.

The oscillation circuit B25*b* generates a clock signal CLK. The oscillation circuit B25*b* may include the clock oscillator B21*b*. The oscillation circuit B25*b* outputs the generated clock signal CLK to the selection circuit 29. In addition, the oscillation circuit B25*b* may output the generated clock signal CLK to the divider circuit 27. Moreover, the oscillation circuit B25*b* may output the generated clock signal CLK to the divider circuit 28. The oscillation circuit B25*b* may generate the clock signal CLK according to control by the clock control circuit 53 to output the generated clock signal CLK to the selection circuit 29, the divider circuit 27, and the divider circuit 28.

The divider circuit 27 divides the clock signal CLK. The divider circuit 27 outputs the clock signal CLK generated by frequency-division to the selection circuit 29. In addition, the divider circuit 28 divides the clock signal CLK. The divider circuit 28 outputs the clock signal CLK generated by frequency-division to the selection circuit 29. The divider circuit 27 and the divider circuit 28 may divide the clock signal CLK to clock signals CLK having frequencies different from each other. Specifically, the divider circuit 27 and the divider circuit 28 use the same clock signal CLK generated by the oscillation circuit B25*b* and may generate clock signals CLK having frequencies different from each other.

The selection circuit 29 receives the clock signal CLK from the oscillation circuit A25*a*, the oscillation circuit B25*b*, the divider circuit 27, and the divider circuit 28. The selection circuit 29 selects a clock signal CLK from the received plurality of clock signals CLK to output the selected one to the counter circuit 52. For example, the selection circuit 29 selects a predetermined clock signal CLK from the plurality of clock signals CLK according to control by the clock control circuit 53, to output the selected one to the counter circuit 52. The selection circuit 29 outputs the selected clock signal CLK to the counter 56 in the counter circuit 52.

Thus, the oscillation circuit A25*a* generates the first clock signal CLK. The oscillation circuit B25*b* may generate the second clock signal CLK having the same frequency as the first clock signal CLK and may generate the second clock signal CLK having a frequency different from the first clock signal CLK. The divider circuit 27 divides the second clock signal CLK to generate a third clock signal CLK. The divider circuit 28 divides the second clock signal CLK to generate a fourth clock signal CLK. The divider circuit 28 may generate the fourth clock signal CLK having the same frequency as the third clock signal CLK and may generate the fourth clock signal CLK having a frequency different from the third clock signal CLK. The selection circuit 29 selects a clock signal CLK to be used for time measurement among the first clock signal CLK, the second clock signal CLK, the third clock signal CLK, and the fourth clock signal CLK, according to a request for time measurement.

The timing management circuit 50 may execute the first time measurement and the second time measurement, for example, when executing the first time measurement and the second time measurement, according to the same clock signal CLK generated from the clock generation circuit 20. In addition, the timing management circuit 50 may execute the first time measurement and the second time measurement according to the clock signals CLK different from each other, when executing the first time measurement and the second time measurement.

The counter circuit 52 holds a count number obtained by counting the number of high voltage states or low voltage states of the clock signal CLK as a counter value. Specifically, the counter 56 receives the clock signal CLK from the selection circuit 29. The counter 56 executes time measurement with use of the clock signal CLK. The counter 56 generates a counter value. The counter 56 outputs the generated counter value to the counter value converter 55, the comparator 57*a*, the comparator 57*b*, and the comparator 57*c*.

The clock control circuit 53 controls generation and stop of the clock signal CLK in the oscillation circuit A25*a*, as well as generation and stop of the clock signal CLK in the oscillation circuit B25*b*. In addition, the clock control circuit 53 controls selection of the clock signal CLK in the selection circuit 29. The clock control circuit 53 controls operations of the oscillation circuit A25*a*, the oscillation circuit B25*b*, and the selection circuit 29 according to control by the calculation circuit 59.

The clock control circuit 53 selects the clock signal CLK to be used in the counter 56 according to the peripheral circuit 41 which has made a request for time measurement. For example, the clock control circuit 53 selects the clock signal CLK having a high frequency in a case in which the peripheral circuit 41 which has made the request for the time measurement needs time measurement with higher resolution.

The timing generation circuit 54 receives the request for the time measurement from the peripheral circuit 41 and also outputs the result of the time measurement to the peripheral circuit 41. The calculation circuit 59 calculates, from a measurement time at which the request has been received in time measurement and the clock signal CLK, a target count number of the measurement time as a target value. In this manner, the calculation circuit 59 calculates the target value from a clock setting and the measurement time. The calculation circuit 59 causes the calculated target value to be stored in the storage units 58*a* to 58*c*.

The comparators 57*a* to 57*c* compare the counter value and the target value with each other. The counter value is a count number obtained by counting the number of high voltage states or low voltage states of the clock signal CLK. The storage units 58*a* to 58*c* store the target value.

The counter value converter 55 converts the counter value received from the counter circuit 52 and outputs the converted counter value to the timer 30. In a case in which the peripheral circuit 41 is the timer 30 and the timing management circuit 50 receives a request for time measurement from the timer 30, the counter value converter 55 outputs the converted counter value to the timer 30. Thus, the timing management circuit 50 may have a function of converting the counter value of the counter circuit 52 and outputting the converted counter value according to the request from the peripheral circuit 41.

For example, it is assumed that the counter value of the timer 30 is 100 and the counter value of the counter circuit 52 is 0 when the timer 30 makes a request for time measurement to the timing management circuit 50. In addition, it is assumed that the timer 30 and the timing management circuit 50 use the clock signal CLK having the same frequency. In that case, in a case in which the counter value of the counter circuit 52 is 15, for example, the counter value converter 55 outputs 115 to the timer 30.

In addition, for example, it is assumed that the counter value of the timer 30 is 100 and the counter value of the counter circuit 52 is 0 when the timer 30 makes a request for time measurement to the timing management circuit 50. In addition, the frequency of the clock signal CLK to be used in the timer 30 is twice the frequency of the clock signal CLK to be used in the timing management circuit 50. In that case, in a case in which the counter value of the counter circuit 52 is 15, for example, the counter value converter 55 outputs 130 to the timer 30.

Figure 12:
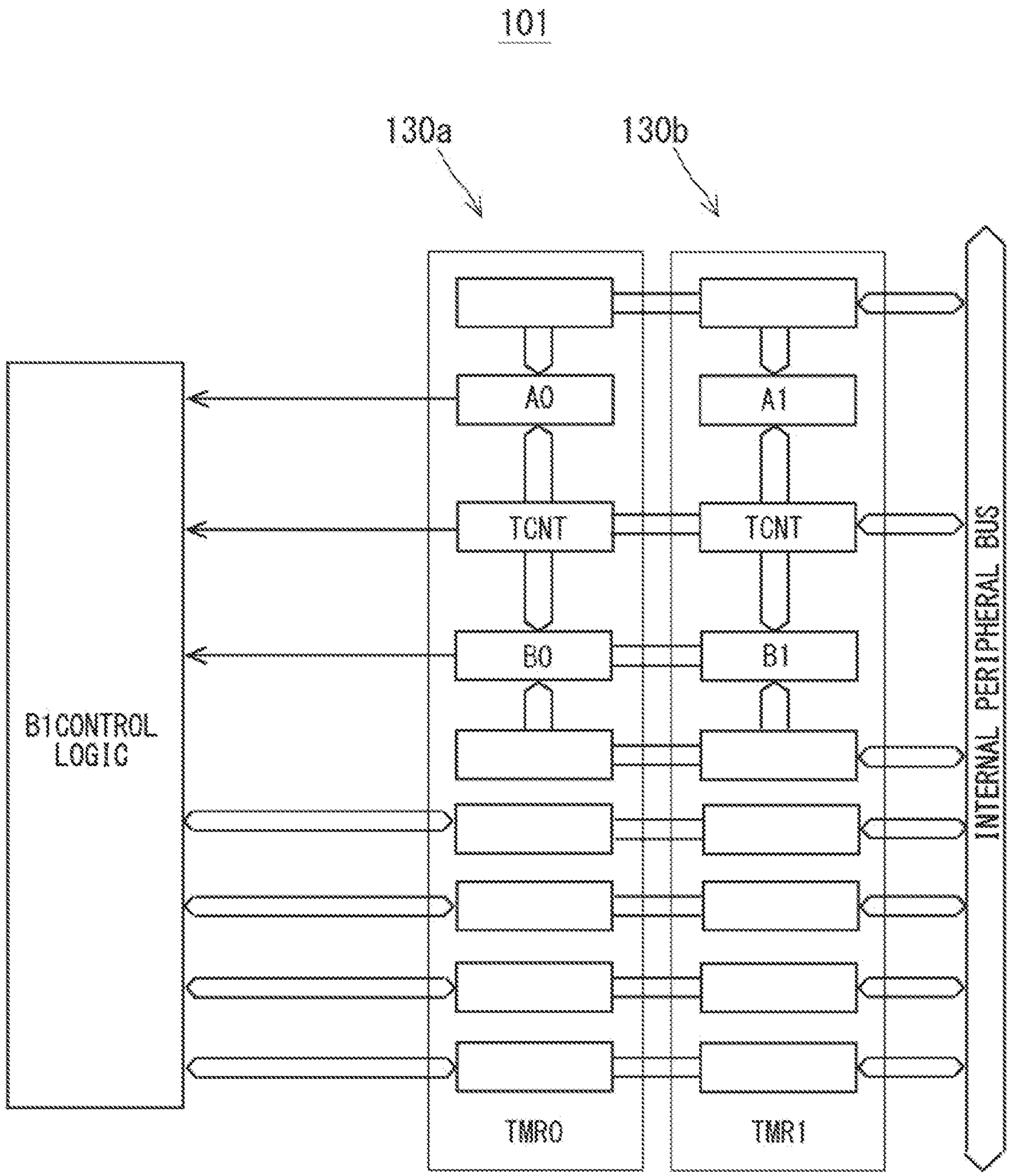
FIG. 12 is a block diagram illustrating the timers in the semiconductor device according to the comparative example.

FIG. 12 is a block diagram illustrating timers 130*a* and 130*b* in the semiconductor device 101 according to the comparative example. As illustrated in FIG. 12, the timer 130*a* in the semiconductor device 101 according to the comparative example includes a comparator A0, a comparator B0, and a counter circuit TCNT. The timer 130*b* includes a comparator A1, a comparator B1, and a counter circuit TCNT. Note that, in order to prevent the figure from becoming complicated, some reference characters and the like are omitted. The semiconductor device 101 according to the comparative example executes time measurement with use of the counter circuit TCNT, the comparator A0, and the like.

In the semiconductor device 101 according to the comparative example, like the plurality of timers 130*a* and 130*b* and the like, in a case in which a plurality of peripheral circuits 41 requiring time measurement are connected and each of the peripheral circuits 41 executes time measurement, consumption current increases.

Figure 13:
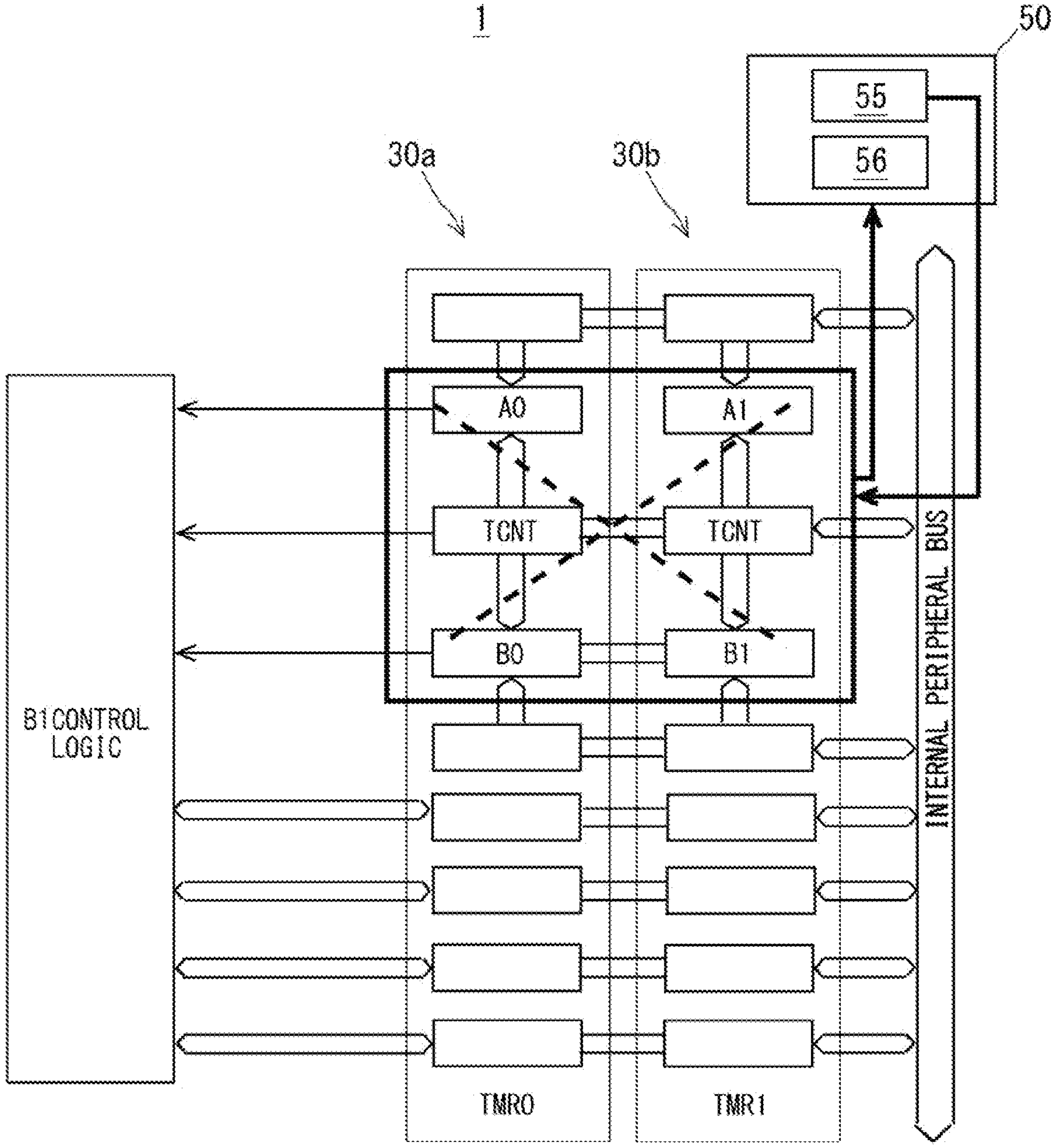
FIG. 13 is a block diagram illustrating a relation between the timers and the timing management circuit in the semiconductor device according to the first embodiment.

FIG. 13 is a block diagram illustrating a relation between timers 30*a* and 30*b* and the timing management circuit 50, in the semiconductor device 1 according to the first embodiment. As illustrated in FIG. 13, the semiconductor device 1 according to the present embodiment does not use a counter circuit TCNT included in each of the timers 30*a* and 30*b*. The timing management circuit 50 has a plurality of functions of executing time measurement. The timing management circuit 50 outputs, to the timers 30*a* and 30*b*, a counter value converted by the counter value converter 55 as a result of time measurement executed after a request for the time measurement is input thereto from the timers 30*a* and 30*b*. Note that the comparator A0 and the like may have a configuration that the comparator 57*a* and the like in the timing management circuit 50 are used or a configuration that the comparator A0 and the like incorporated in the timers 30*a* and 30*b* are used.

Next, an application example to the compare match timer will be described. The semiconductor device 1 according to the present embodiment can be made to correspond to a function of the compare match timer. In the following description, comparing with the comparative example, functions of the present embodiment will be described.

Figure 14:
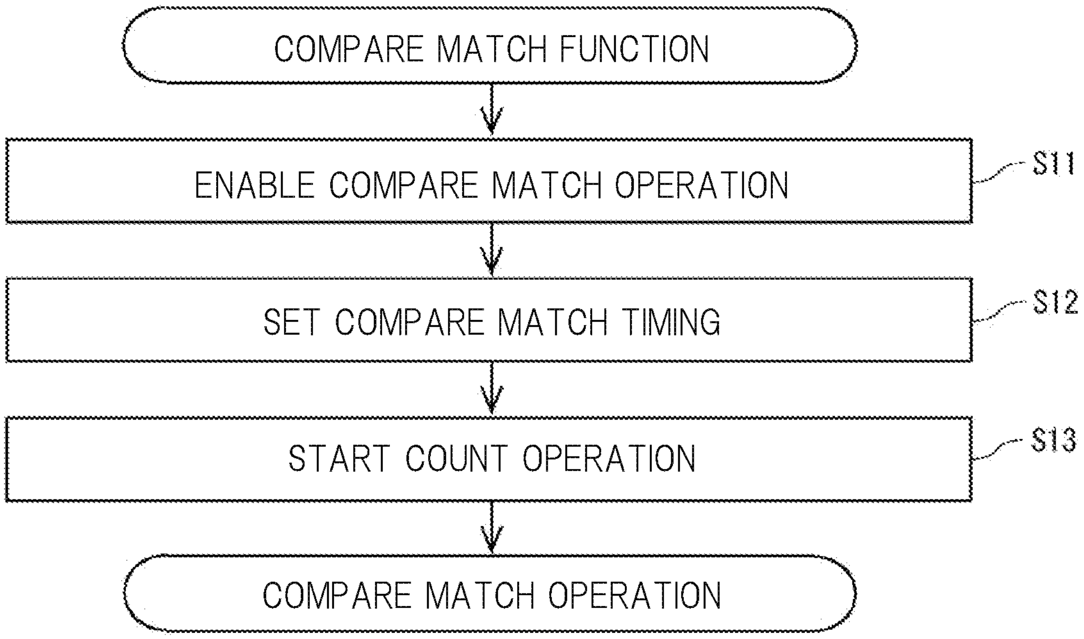
FIG. 14 is a flow chart illustrating a setting procedure of a compare match timer operation in the semiconductor device according to the comparative example.

FIG. 14 is a flow chart illustrating a setting procedure of a compare match timer operation in the semiconductor device 101 according to the comparative example. As illustrated in FIG. 14, in the semiconductor device 101 of the comparative example, in order to operate the compare match function, first, as indicated in step S11, the compare match operation is enabled. Specifically, the compare match operation is enabled with a CMWIOR register. The CMWIOR register is, for example, a timer I/O control register.

Subsequently, as indicated in step S12, setting of compare match is carried out. Specifically, a timing to generate a compare match is set to the CMWCOR register. The CMWCOR register is, for example, a compare match constant register.

Next, as indicated in step S13, a count operation is started. Specifically, the CMWCR register is set, and a CMWSTR. STR bit is set to "1" to start the count operation. The CMWCR register is, for example, a timer control register, and the CMWSTR. STR bit is a bit of the timer start register. Then, the count operation is continued until the compare match with the timing set to the compare match constant register is achieved. In this manner, the semiconductor device 101 according to the comparative example carries out the compare match operation.

Figure 15:
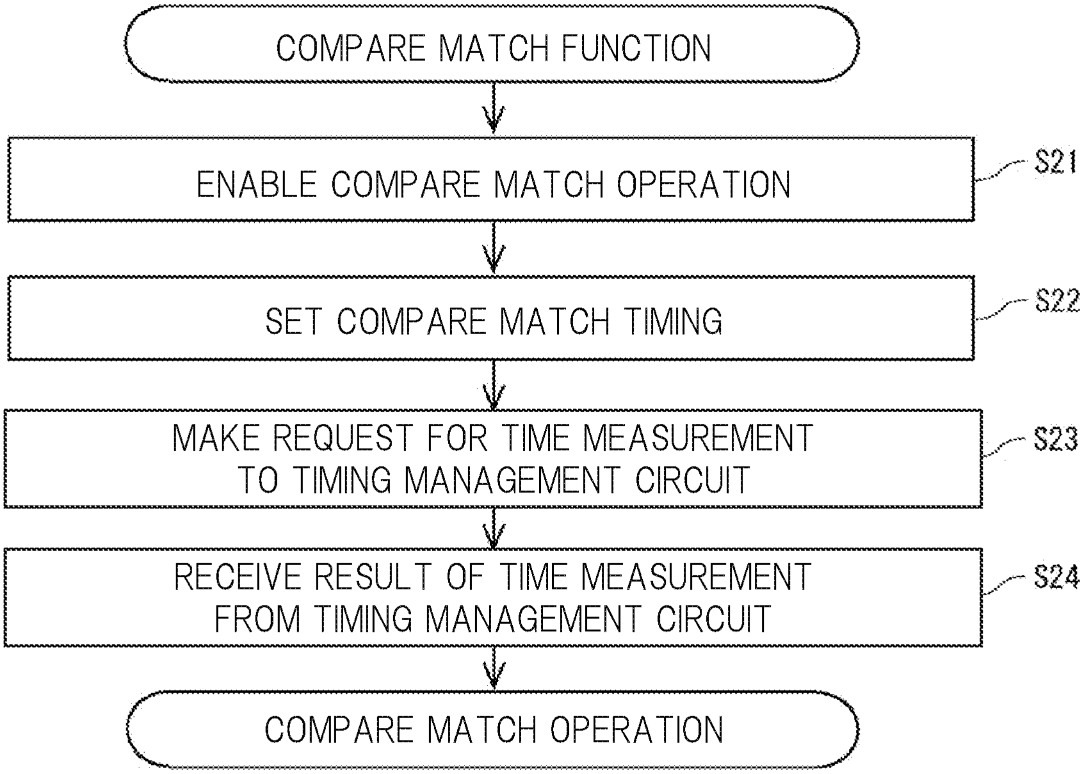
FIG. 15 is a flow chart illustrating a setting procedure of a compare match timer operation in the semiconductor device according to the first embodiment.

Next, an example in which the compare match timer function is applied to the semiconductor device 1 according to the present embodiment will be described. The semiconductor device 1 according to the present embodiment may have such a configuration that the timer 30 does not include a counter circuit. FIG. 15 is a flow chart illustrating a setting procedure of a compare match timer operation in the semiconductor device 1 according to the first embodiment. Step S21 to step S22 in FIG. 15 are similar to step S11 to step S12 in FIG. 14.

Then, as indicated in step S23, the timer 30 makes a request for time measurement to the timing management circuit 50. Accordingly, the timing management circuit 50 executes the time measurement. Subsequently, the timing management circuit 50 outputs, as a result of the time measurement, a counter value to the timer 30. Hence, as indicated in step S24, the timer 30 receives the result of the time measurement from the timing management circuit 50. In this manner, in the semiconductor device 1 according to the present embodiment, the timer 30 can carry out the compare match operation. Thus, the semiconductor device 1 according to the present embodiment causes the timing management circuit 50 to execute the time measurement, so that the function such as the compare match timer function similar to the semiconductor device 101 according to the comparative example can be operated.

Figure 16:
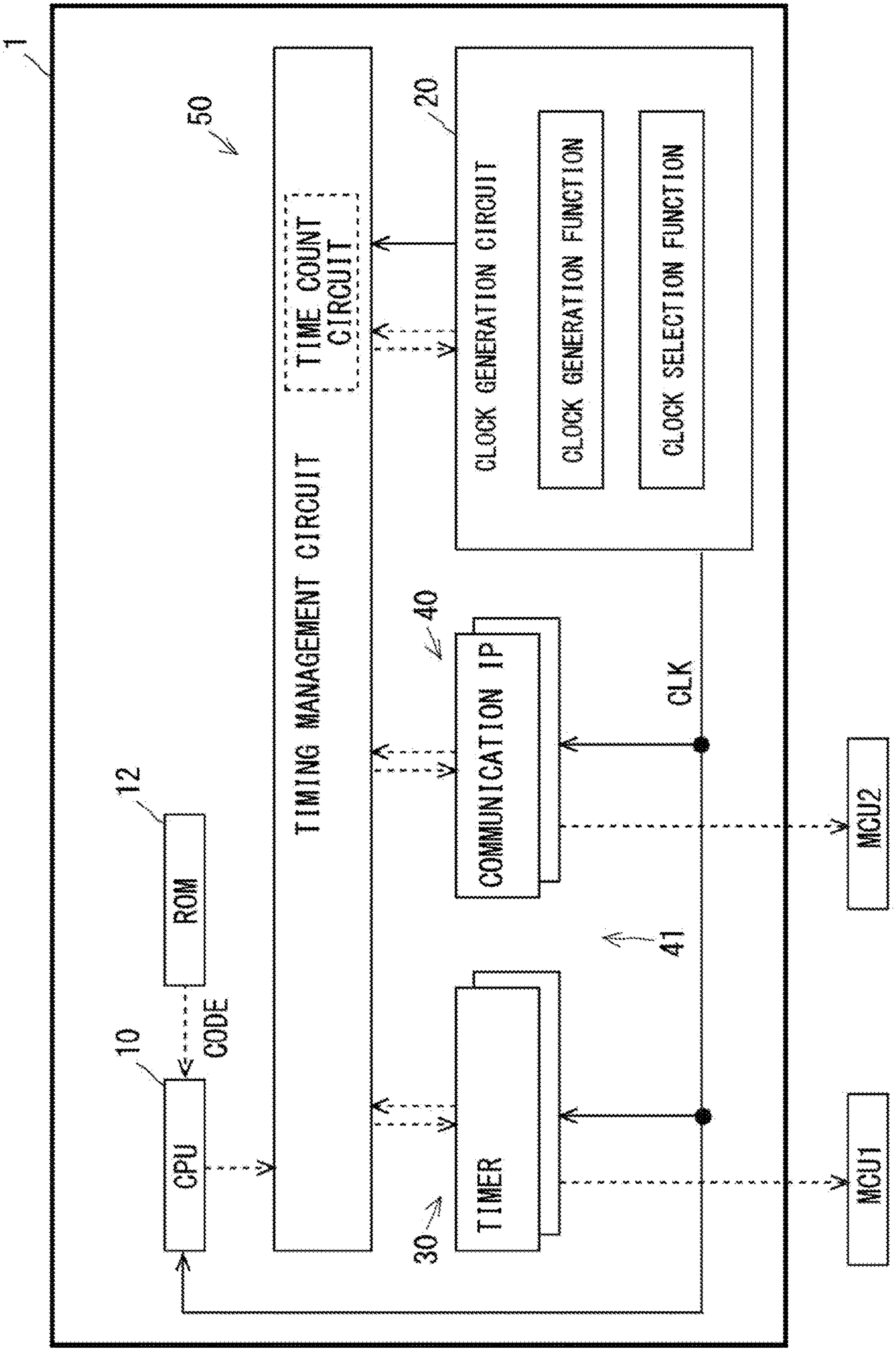
FIG. 16 is a block diagram illustrating the semiconductor device according to the first embodiment.

FIG. 16 is a block diagram illustrating the semiconductor device 1 according to the first embodiment. The semiconductor device 1 includes, for example, an MCU. As illustrated in FIG. 16, the semiconductor device 1 includes the arithmetic processing unit 10, the storage device 12, the clock generation circuit 20, the timer 30, the communication IP 40, and the timing management circuit 50. The plurality of peripheral circuits 41 including the timer 30 and the communication IP 40 may each include a circuit requiring time measurement. The timing management circuit 50 includes a circuit such as the counter circuit 52 which executes time measurement. The plurality of peripheral circuits 41 including the timer 30 and the communication IP 40 in the semiconductor device 1 may be connected to other semiconductor devices MCU1 and MCU2 and the like in a state in which information can be transmitted with each other.

The clock generation circuit 20 has a clock generation function and a clock selection function. In the clock generation circuit 20, the clock generation function includes the oscillation circuit A25*a*, the oscillation circuit B25*b*, the divider circuit 27, and the divider circuit 28, which are described above, for example. The clock selection function includes the selection circuit 29 described above. The arithmetic processing unit 10 executes a program (instruction code) written in the storage device 12 and sets the timing management circuit 50 and the peripheral circuits 41.

Figure 17:
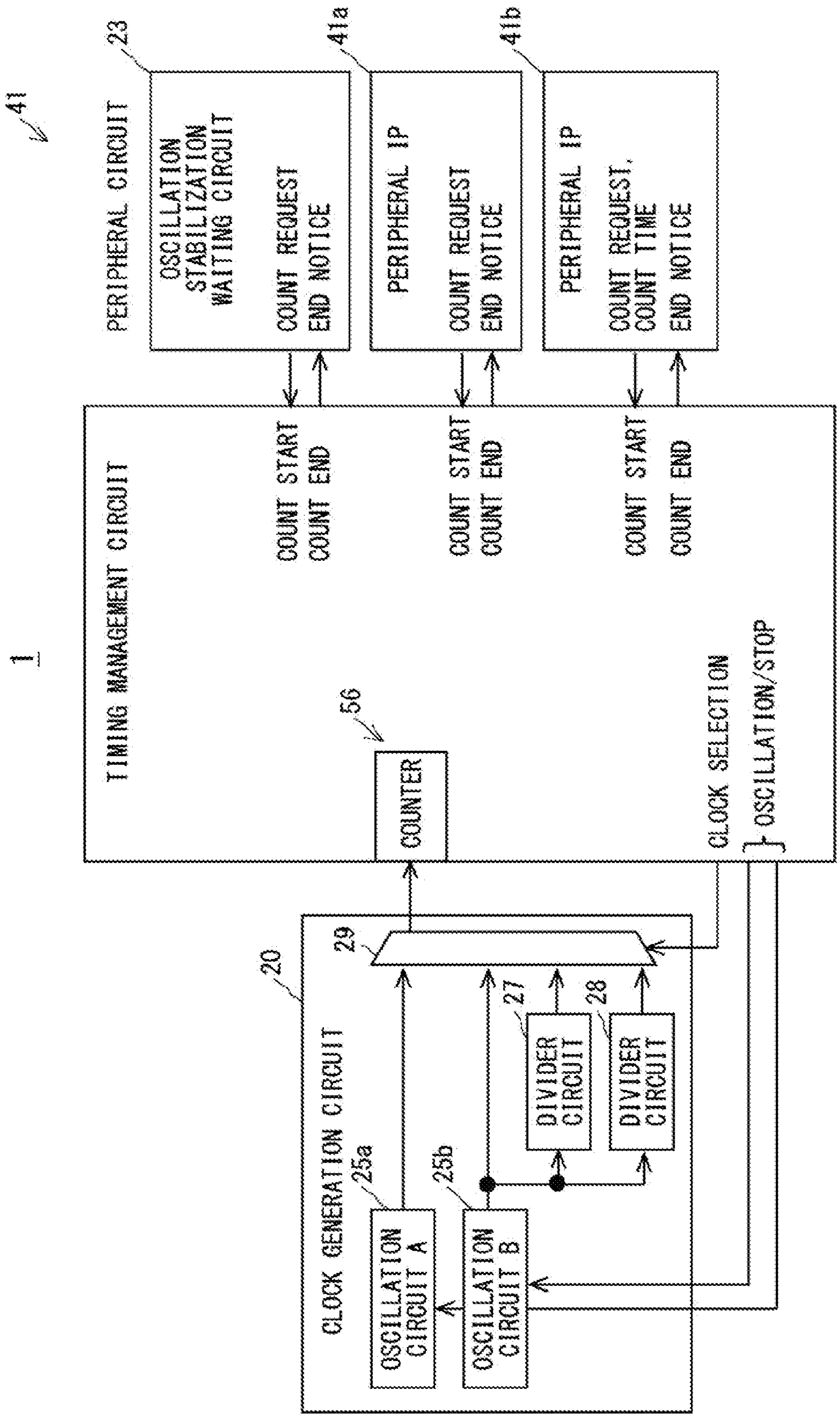
FIG. 17 is a block diagram illustrating a relation between the clock generation circuit and the timing management circuit and a relation between the timing management circuit and the peripheral circuit in the semiconductor device according to the first embodiment.

FIG. 17 is a block diagram illustrating a relation between the clock generation circuit 20 and the timing management circuit 50 and a relation between the timing management circuit 50 and the peripheral circuits 41 in the semiconductor device 1 according to the first embodiment. As illustrated in FIG. 17, the timing management circuit 50 includes the counter 56 for time measurement. In addition, the timing management circuit 50 controls the clock generation circuit 20.

As described above, the clock generation circuit 20 includes the oscillation circuit A25*a*, the oscillation circuit B25*b*, the divider circuit 27, the divider circuit 28, and the selection circuit 29. The timing management circuit 50 controls oscillation and stop of the oscillation circuit A25*a*, oscillation and stop of the oscillation circuit B25*b*, the divider circuits 27 and 28, as well as the selection circuit 29. Also, the timing management circuit 50 operates the counter 56 with use of the clock signal CLK to be supplied. In addition, the timing management circuit 50 adjusts a frequency of the clock signal CLK, according to selection. Moreover, the timing management circuit 50 stops the unnecessary oscillation circuits A25*a* and B25*b* to thereby reduce consumption current.

The peripheral circuits 41 including the oscillation stabilization waiting circuit 23, the peripheral IPs 41*a* and 41*b*, and the like output a request for start of time measurement to the timing management circuit 50, when timing generation is needed during operation. In a case in which measurement time is not determined in advance, the measurement time is also notified. The timing management circuit 50 starts time measurement in response to the request, and then outputs a notification regarding completion of the measurement after the determined time has elapsed.

Figure 18:
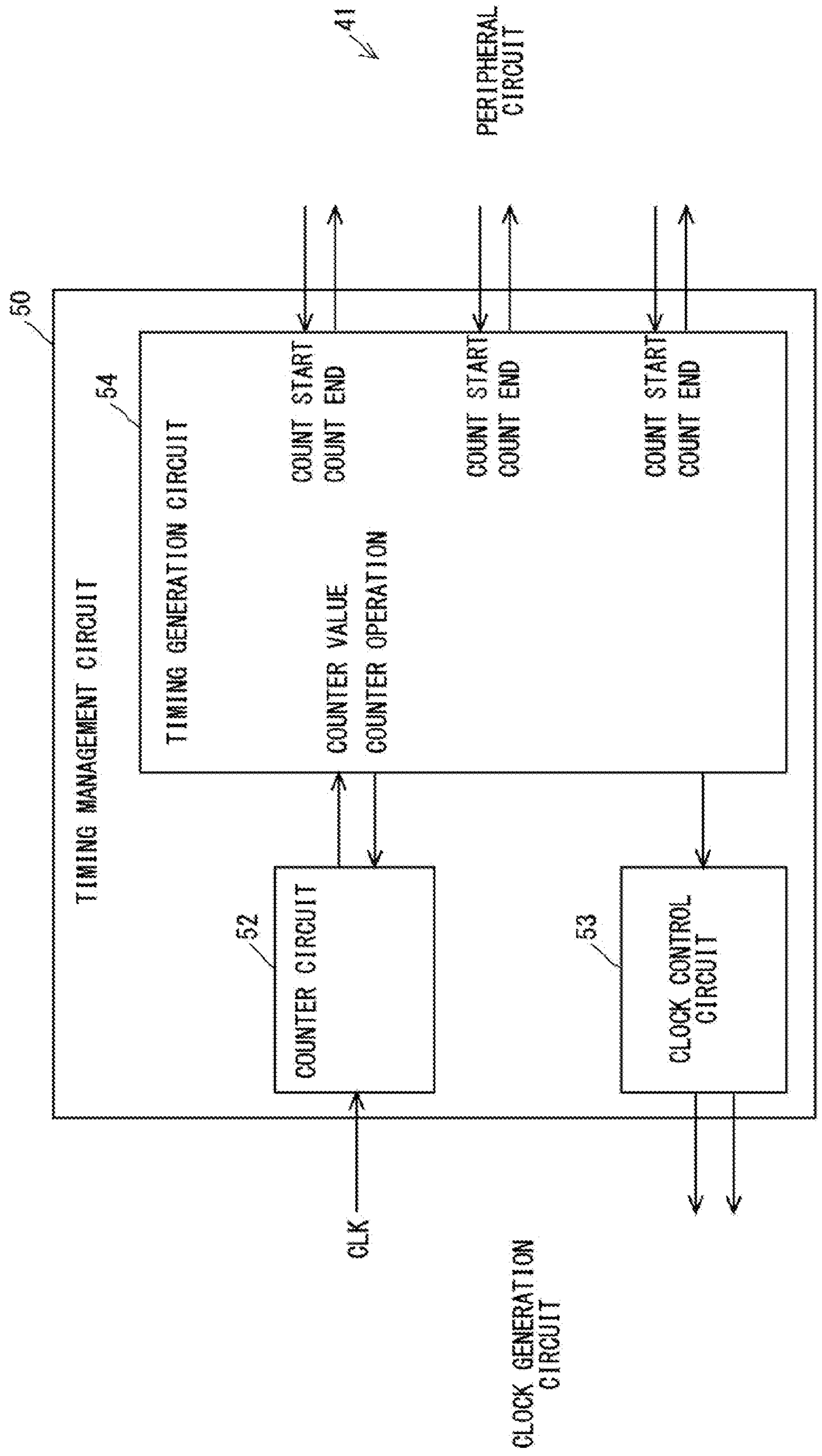
FIG. 18 is a block diagram illustrating a timing management circuit of the semiconductor device according to the first embodiment.

FIG. 18 is a block diagram illustrating the timing management circuit 50 of the semiconductor device 1 according to the first embodiment. As illustrated in FIG. 18, the timing management circuit 50 has the counter circuit 52, the clock control circuit 53, and the timing generation circuit 54. The timing generation circuit 54 receives requests from the plurality of peripheral circuits 41, to select an optimal clock signal CLK which is to be required for count operation in the counter circuit 52 for time measurement. Then, the timing generation circuit 54 makes a request for supplying the selected clock signal CLK to the counter circuit 52, to the clock control circuit 53. The counter circuit 52 carries out a count operation for necessary time measurement with use of the clock signal CLK to be supplied, according to control by the timing generation circuit 54.

Figure 19:
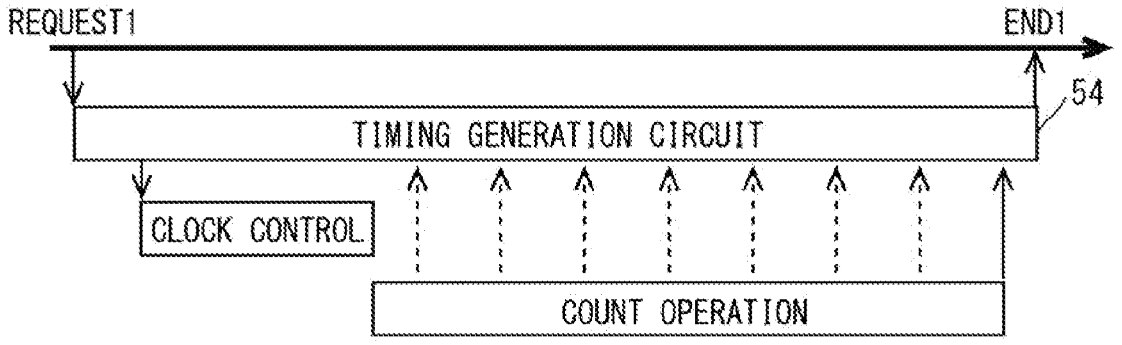
FIG. 19 is a diagram illustrating a count operation of the timing management circuit in the case of a single request in which a request for time measurement is received from one peripheral circuit, in the semiconductor device according to the first embodiment.

FIG. 19 is a diagram illustrating a count operation of the timing management circuit 50 in the case of a single request in which a request for time measurement is received from one of the peripheral circuits 41, in the semiconductor device 1 according to the first embodiment. As illustrated in FIG. 19, the timing generation circuit 54 receives a request REQUEST1 from one of the peripheral circuits 41, to select an optimal clock signal CLK which is to be required for a count operation in the counter circuit 52 for time measurement. The timing generation circuit 54 makes a request for supplying the selected clock signal CLK to the counter circuit 52, to the clock control circuit 53. The counter circuit 52 carries out a count operation for executing time measurement according to control by the timing generation circuit 54, with use of the clock signal CLK to be supplied. After the completion END1 of the time measurement, the timing generation circuit 54 outputs the measurement result to the relevant peripheral circuit 41.

Figure 20:
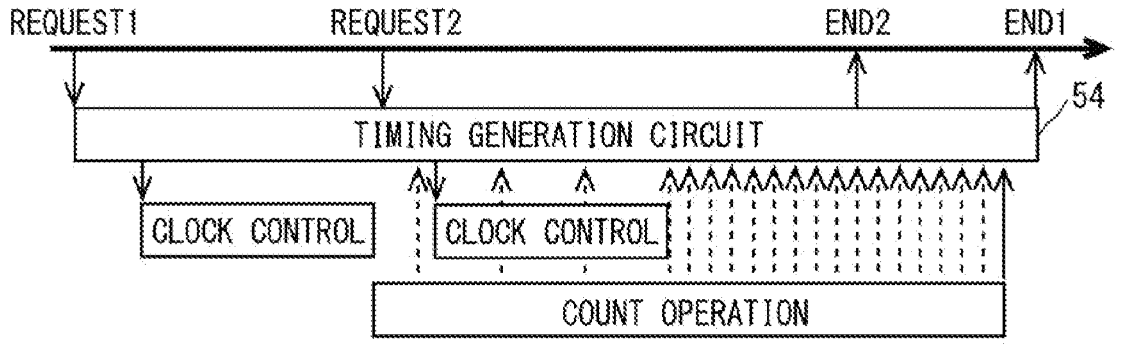
FIG. 20 is a diagram illustrating a count operation of the timing management circuit in the case of a multi-request in which requests for time measurement are received from a plurality of peripheral circuits, in the semiconductor device according to the first embodiment.

FIG. 20 is a diagram illustrating a count operation of the timing management circuit 50 in the case of a multi-request in which requests for time measurement are received from the plurality of peripheral circuits 41, in the semiconductor device 1 according to the first embodiment. As illustrated in FIG. 20, first, the timing generation circuit 54 receives a request REQUEST1 from a first peripheral circuit 41, to select an optimal clock signal CLK which is to be required for a count operation in the counter circuit 52 for time measurement, as a first clock signal CLK. Then, the timing generation circuit 54 makes a request for supplying the selected first clock signal CLK to the counter circuit 52, to the clock control circuit 53. The counter circuit 52 carries out a count operation for executing time measurement, according to control by the timing generation circuit 54, with use of the first clock signal CLK to be supplied.

Next, when receiving a request REQUEST2 from a second peripheral circuit 41, the timing generation circuit 54 selects an optimal clock signal CLK which is to be required for a count operation in the counter circuit 52 for time measurement, as a second clock signal CLK. Then, the timing generation circuit 54 makes a request for supplying the selected second clock signal CLK to the counter circuit 52, to the clock control circuit 53. The counter circuit 52 carries out a count operation for executing time measurement according to control by the timing generation circuit 54, with use of the second clock signal CLK to be supplied.

Next, after the completion END2 of the time measurement according to the request REQUEST2 from the second peripheral circuit 41, the timing generation circuit 54 outputs the measurement result to the second peripheral circuit 41. Subsequently, after the completion END1 of the time measurement according to the request REQUEST1 from the first peripheral circuit 41, the timing generation circuit 54 outputs the measurement result to the first peripheral circuit 41. In this example, the frequency of the first clock signal CLK is lower than the frequency of the second clock signal CLK. In addition, the measurement time measured according to the request REQUEST1 from the first peripheral circuit 41 is longer than the measurement time measured according to the request REQUEST2 from the second peripheral circuit 41.

Figure 21:
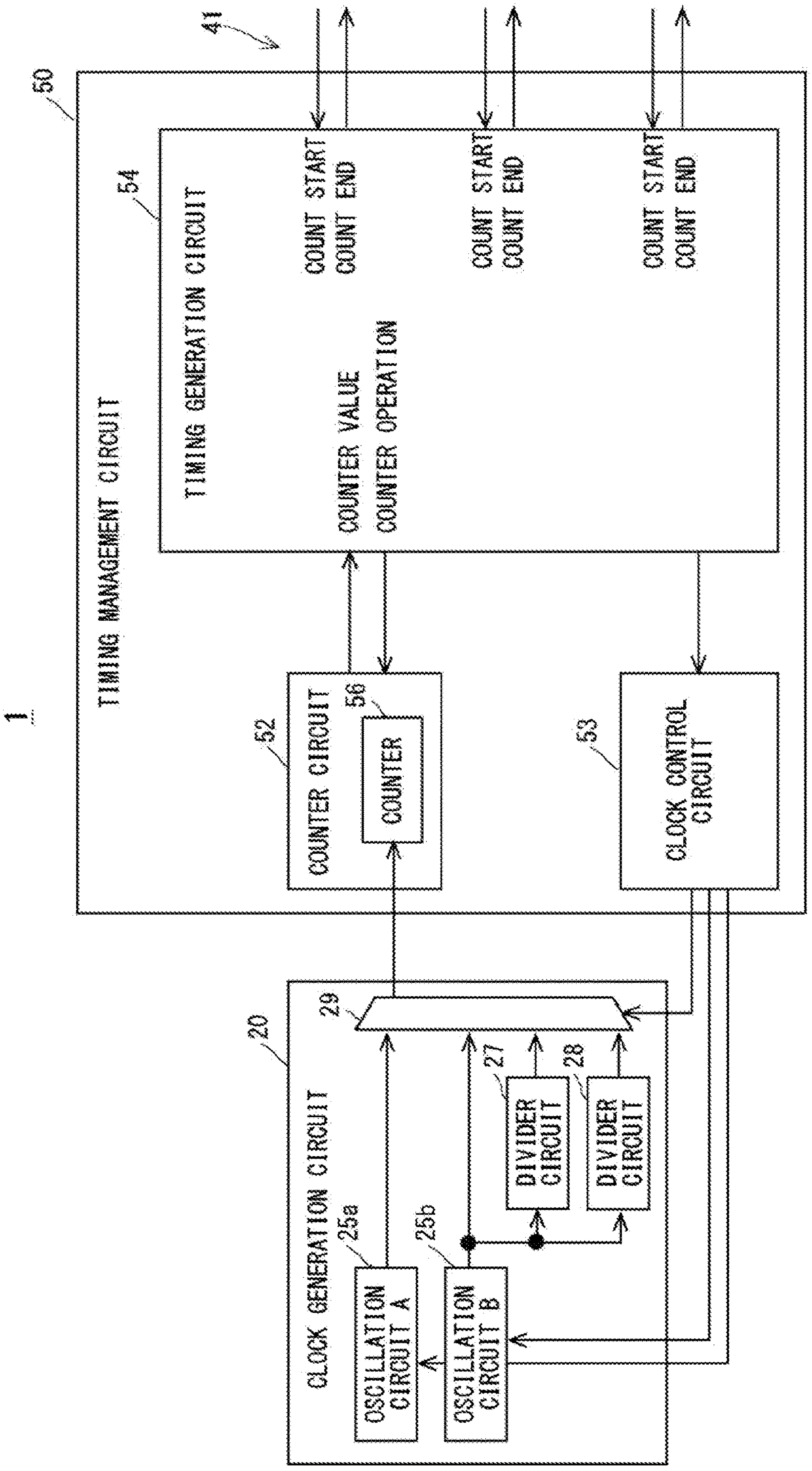
FIG. 21 is a block diagram illustrating the clock generation circuit and the timing management circuit in the semiconductor device according to the first embodiment.

FIG. 21 is a block diagram illustrating the clock generation circuit 20 and the timing management circuit 50 in the semiconductor device 1 according to the first embodiment. As illustrated in FIG. 21, in the timing management circuit 50, the clock control circuit 53 receives a request from the timing generation circuit 54 to control the clock generation circuit 20. For example, in a case in which time measurement with higher resolution is needed, an oscillator which generates a clock signal CLK having a higher frequency is operated.

The clock control circuit 53 controls the selection circuit 29 to select the clock signal CLK to be supplied to the counter circuit 52. In addition, the clock control circuit 53 controls the selection circuit 29 to select a frequency division ratio of the divider circuit 27 and the divider circuit 28. In this manner, the clock control circuit 53 causes the clock signal CLK having a minimum frequency to be supplied to the counter circuit 52.

Figure 22:
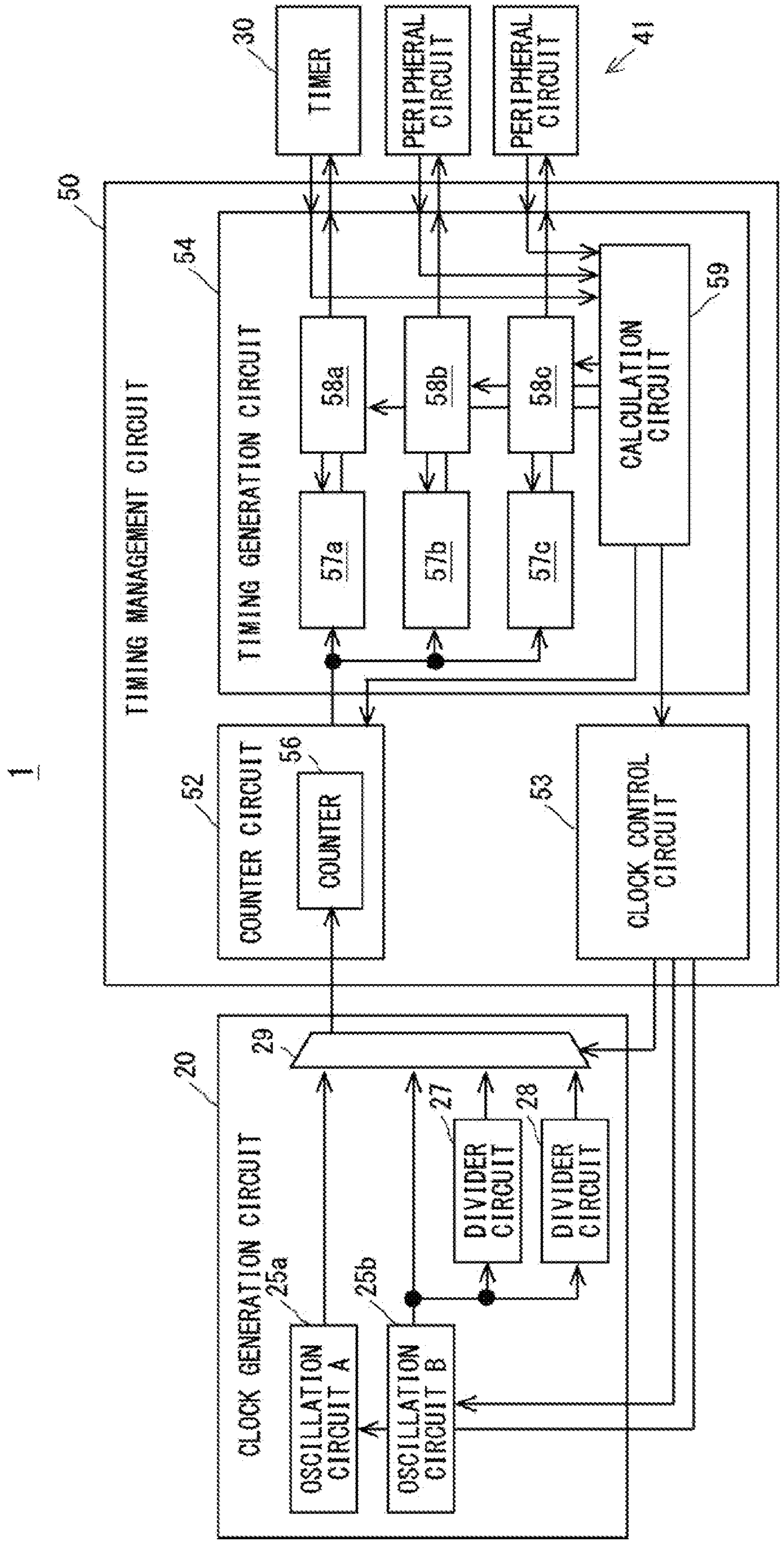
FIG. 22 is a block diagram illustrating a connection relation between the timing generation circuit and the peripheral circuit in the timing management circuit in the semiconductor device according to the first embodiment.

FIG. 22 is a block diagram illustrating a connection relation between the timing generation circuit 54 in the timing management circuit 50 and the peripheral circuit 41, in the semiconductor device 1 according to the first embodiment. As illustrated in FIG. 22, the timing generation circuit 54 includes the calculation circuit 59 which calculates a target value, the comparators 57*a* to 57*c* which compares a counter value with the target value, and the storage units 58*a* to 58*c* which store the target value. Note that the timing management circuit 50 may not include the above-mentioned counter value converter 55.

Figure 23:
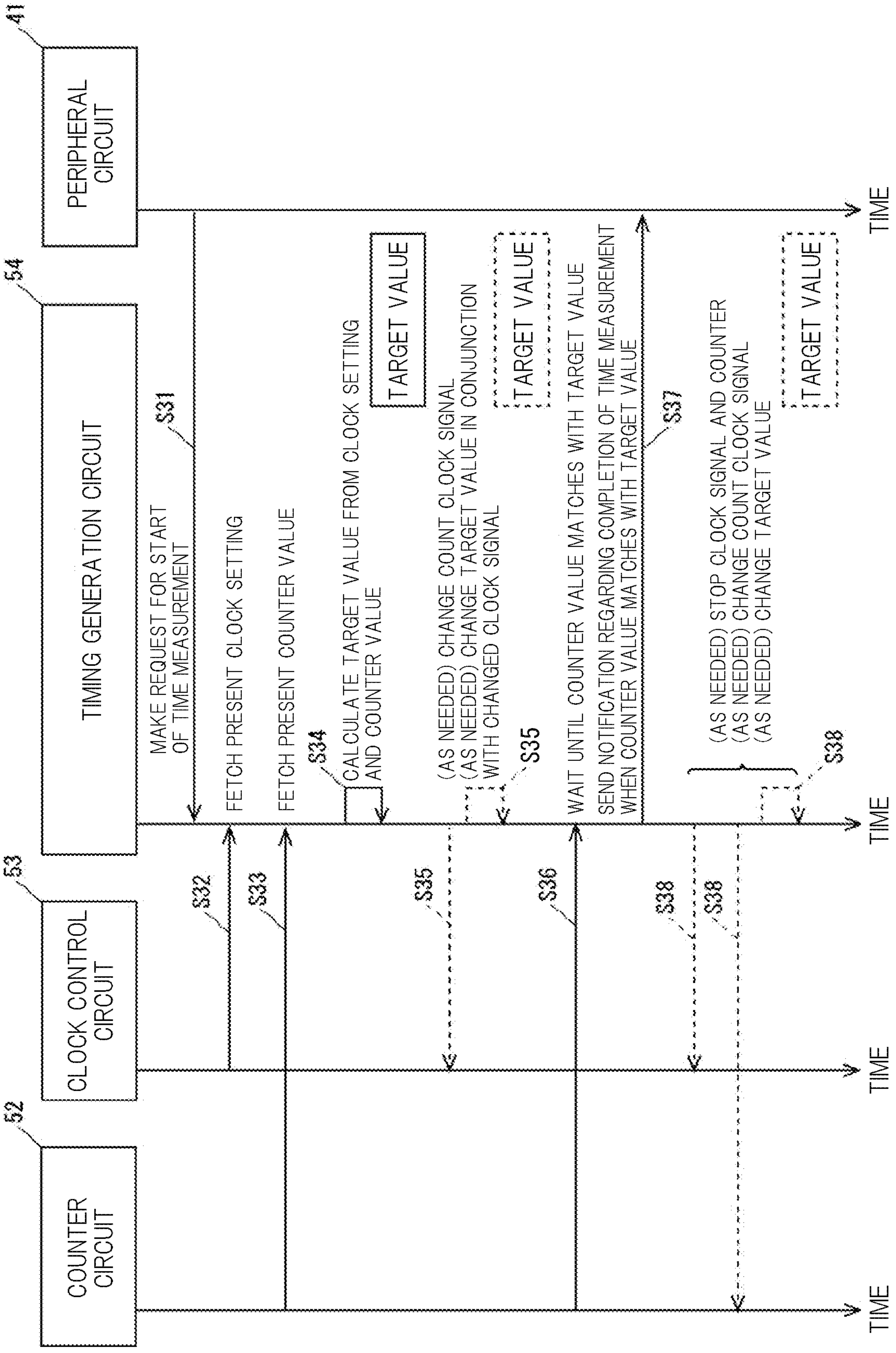
FIG. 23 is a flow chart illustrating an operation of the timing generation circuit in the semiconductor device according to the first embodiment.

FIG. 23 is a flow chart illustrating an operation of the timing generation circuit 54 in the semiconductor device 1 according to the first embodiment. As indicated in step S31 of FIG. 23, the timing generation circuit 54 receives a request for start of time measurement from the peripheral circuit 41. Then, as indicated in step S32, the timing generation circuit 54 fetches a present clock setting from the clock control circuit 53. Subsequently, indicated in step S33, the timing generation circuit 54 fetches a present counter value from the counter circuit 52.

Next, as indicated in step S34, the timing generation circuit 54 calculates a target value from the clock setting and the counter value. Specifically, the calculation circuit 59 calculates a target value serving as a target count number of the time measurement, from a frequency of the clock signal CLK and the present counter value. The calculation circuit 59 causes the calculated target value to be stored in the storage units 58*a* to 58*c*.

Next, as indicated in step S35, the timing generation circuit 54 may cause the clock control circuit 53 to change a count clock signal CLK, as needed. In addition, the timing generation circuit 54 may change the target value in conjunction with the changed clock signal CLK, as needed. For example, in a case in which a clock setting for another request for time measurement is different, the timing generation circuit 54 change the count clock signal CLK and the target value.

Next, as indicated in step S36, the timing generation circuit 54 waits until the counter value matches with the target value. Then, as indicated in step S37, when the counter value matches with the target value, the timing generation circuit 54 notifies the peripheral circuit 41 of the completion of the time measurement, outputting the result of the time measurement.

Next, as indicated in step S38, the timing generation circuit 54 causes the clock control circuit 53 to stop the clock signal CLK, as needed, and causes the counter circuit 52 to stop counting the clock signal CLK. In addition, as needed, the timing generation circuit 54 may cause the clock control circuit 53 to change the count clock signal CLK. In addition, the timing generation circuit 54 may change the target value, as needed.

Then, a count operation in the timing management circuit 50 in a case of a single request in which a request for time measurement is received from one of the peripheral circuits 41 will be described. In the case of the single request, the operation of the timing generation circuit 54 in FIG. 23 described above can be applied as it is.

Figure 24:
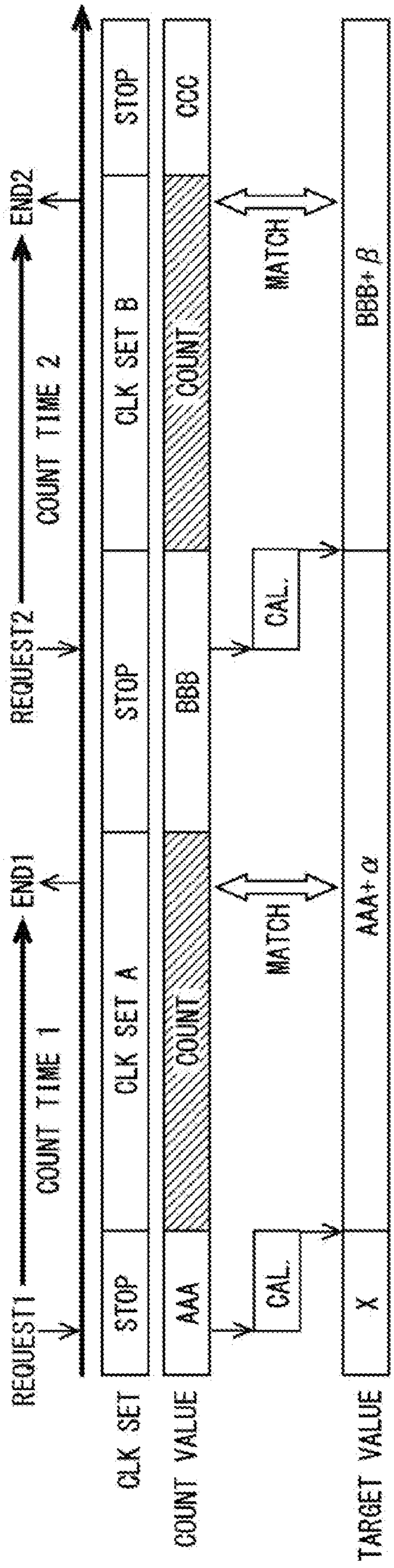
FIG. 24 is a diagram illustrating a count operation of the timing management circuit in the case of a single request in which a request for time measurement is received from one peripheral circuit, in the semiconductor device according to the first embodiment.

FIG. 24 is a diagram illustrating a count operation of the timing management circuit 50 in the case of a single request in which a request for time measurement is received from one peripheral circuit 41, in the semiconductor device 1 according to the first embodiment. As indicated in FIG. 24, the timing generation circuit 54 receives a request (REQUEST1) for start of time measurement (COUNT TIME 1) from the one peripheral circuit 41. Subsequently, the timing generation circuit 54 fetches a present clock setting (CLK SET A) from the clock control circuit 53. Then, the timing generation circuit 54 fetches a present counter value (AAA) from the counter circuit 52.

Then, the timing generation circuit 54 calculates the target value from of the clock setting and the counter value. Specifically, the calculation circuit 59 calculates the target value (AAA+$\alpha$) serving as the target count number of the time measurement from the frequency of the clock signal CLK and the present counter value (AAA). Then, the timing generation circuit 54 waits until the counter value matches with the target value (AAA+$\alpha$). Then, when the counter value matches with the target value, the timing generation circuit 54 notifies the peripheral circuit 41 of the completion of the time measurement (END1).

Next, in a case in which there are no other requests for time measurement, the timing generation circuit 54 causes the clock control circuit 53 to stop the clock signal CLK, the timing generation circuit 54 may cause the counter circuit 52 to stop counting the clock signal CLK. In addition, the timing generation circuit 54 may causes the clock control circuit 53 to change the count clock signal CLK.

Next, in a case in which a request (REQUEST2) for start of time measurement (COUNT TIME 2) is received from the peripheral circuit 41, the timing generation circuit 54 carries out the processing similar to the request (REQUEST1).

Specifically, the timing generation circuit 54 fetches a present clock setting (CLK SET B) from the clock control circuit 53, and fetches a present counter value (BBB) from the counter circuit 52. Then, the timing generation circuit 54 calculates the target value (BBB+β) from the clock setting and the counter value. When the counter value matches with the target value, the timing generation circuit 54 notifies the peripheral circuit 41 of the completion of the time measurement (END2).

Then, a count operation of the timing management circuit 50 in a case of a multi-request in which requests for time measurement are received from the plurality of peripheral circuits 41 in an overlapping manner will be described. In the case of the multi-request, the operation in the timing generation circuit 54 in FIG. 23 described above can be applied in an overlapping manner.

Figure 25:
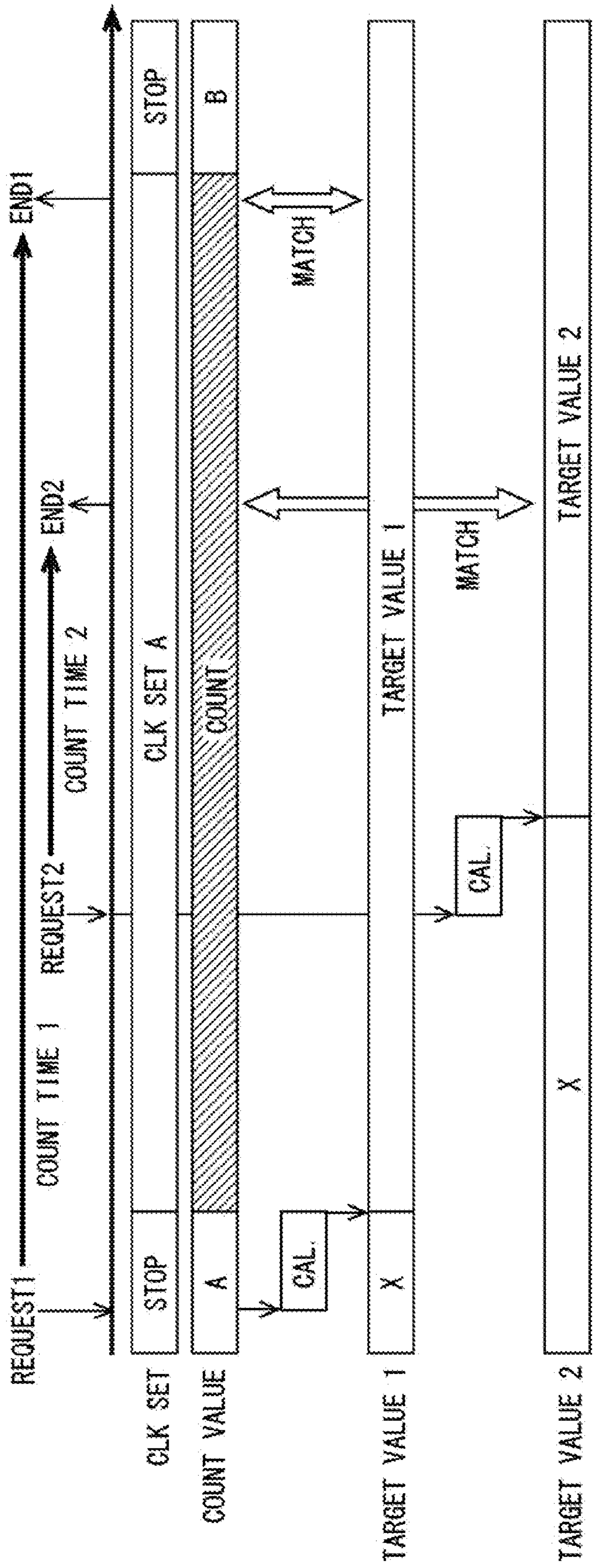
FIG. 25 is a diagram illustrating a count operation of the timing management circuit in the case of a multi-request in which requests for time measurement are received from a plurality of peripheral circuits in an overlapping manner, in the semiconductor device according to the first embodiment.

FIG. 25 is a diagram illustrating a count operation of the timing management circuit 50 in the case of a multi-request in which requests for time measurement are received from the plurality of peripheral circuits 41 in an overlapping manner, in the semiconductor device 1 according to the first embodiment. First, a case in which the count operation is not accompanied by switching of the clock signal CLK will be described. As indicated in FIG. 25, the timing generation circuit 54 receives a request (REQUEST1) for start of time measurement (COUNT TIME 1) from the peripheral circuit 41. Subsequently, the timing generation circuit 54 fetches the present clock setting (CLK SET A) from the clock control circuit 53. Then, the timing generation circuit 54 fetches a present counter value (A) from the counter circuit 52.

Then, the timing generation circuit 54 calculates the target value from the clock setting and the counter value. Specifically, the calculation circuit 59 calculates the target value (TARGET VALUE 1) serving as the target count number of the time measurement from the frequency of the clock signal CLK and the present counter value (A). Then, the timing generation circuit 54 waits until the counter value matches with the target value (TARGET VALUE 1).

In the case of the multi-request, while the timing generation circuit 54 waits until the counter value matches with the target value (TARGET VALUE 1), the timing generation circuit 54 receives a request (REQUEST2) for start of time measurement (COUNT TIME 2) from the peripheral circuit 41. In this case, the timing generation circuit 54 fetches the clock setting (CLK SET A) from the clock control circuit 53. Then, the timing generation circuit 54 fetches a present counter value (A+α) from the counter circuit 52. Then, the timing generation circuit 54 calculates the target value from the clock setting and the counter value. Specifically, the calculation circuit 59 calculates the target value (TARGET VALUE 2) serving as the target count number of time measurement from the frequency of the clock signal CLK and the present counter value (A+α). Then, the timing generation circuit 54 waits until the counter value matches with the target value (TARGET VALUE 2).

When the counter value matches with any one of the target values, the timing generation circuit 54 notifies the relevant peripheral circuit 41 of the completion (END1 or END2) of the time measurement. For example, when the counter value matches with the target value (TARGET VALUE 2), the timing generation circuit 54 notifies the corresponding peripheral circuit 41 of the completion (END2) of the time measurement. Then, when the counter value matches with the target value (TARGET VALUE 1), the timing generation circuit 54 notifies the corresponding peripheral circuit 41 of the completion (END1) of the time measurement.

Figure 26:
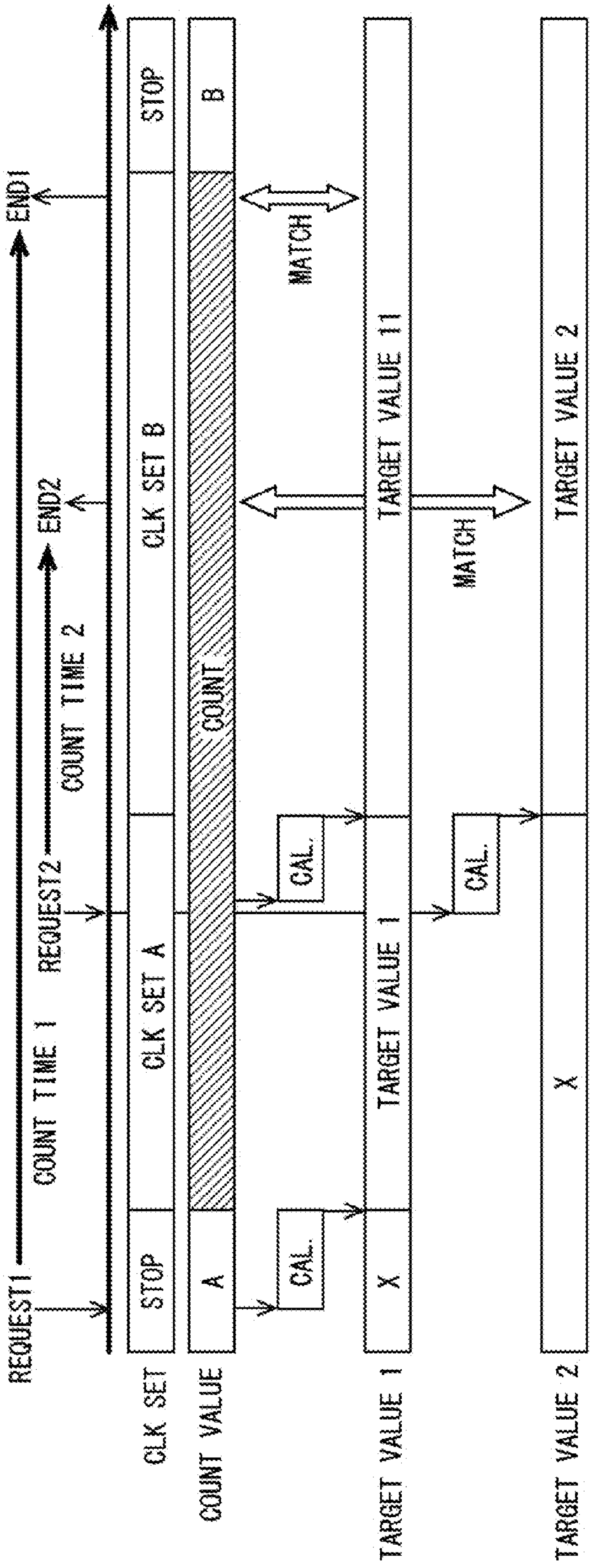
FIG. 26 is a diagram illustrating a count operation of the timing management circuit which is accompanied by switching of the clock signal in the case of a multi-request in which requests for time measurement are received from a plurality of peripheral circuits in an overlapping manner, in the semiconductor device according to the first embodiment.

Next, in the case of the multi-request, a count operation of the timing management circuit 50 in the case in which the count operation is accompanied by switching of the clock signal CLK will be described. FIG. 26 is a diagram illustrating a count operation of the timing management circuit 50 which is accompanied by switching of the clock signal in the case of the multi-request in which requests for time measurement are received from the plurality of peripheral circuits 41 in an overlapping manner, in the semiconductor device 1 according to the first embodiment. As indicated in FIG. 26, the timing generation circuit 54 receives a request (REQUEST1) for start of time measurement (COUNT TIME 1) from the peripheral circuit 41. Then, the timing generation circuit 54 fetches the present clock setting (CLK SET A) from the clock control circuit 53. Then, the timing generation circuit 54 fetches the present counter value (A) from the counter circuit 52.

Then, the timing generation circuit 54 calculates the target value from the clock setting and the counter value. Specifically, the calculation circuit 59 calculates the target value (TARGET VALUE 1) serving as the target count number of the time measurement from the frequency of the clock signal CLK and the present counter value (A). Then, the timing generation circuit 54 waits until the counter value matches with the target value (TARGET VALUE 1).

In the case of the multi-request, while the counter value matches with the target value (TARGET VALUE 1), the timing generation circuit 54 receives the request (REQUEST2) for start of time measurement (COUNT TIME 2), from the peripheral circuit 41. In this example, the request (REQUEST2) is accompanied by switching of the clock signal CLK. In this case, the timing generation circuit 54 causes the clock control circuit 53 to switch the clock setting. Specifically, the timing generation circuit 54 fetches the clock setting (CLK SET B) according to the request (REQUEST2) from the peripheral circuit 41. Then, the timing generation circuit 54 fetches the present counter value (A+α) from the counter circuit 52.

Next, the timing generation circuit 54 calculates the target value from the clock setting and the counter value. Specifically, the calculation circuit 59 calculates the target value (TARGET VALUE 2) of the request (REQUEST2) from the clock setting (CLK SET B) according to the request (REQUEST2) and the counter value (Ata). In addition, in association with the switching of the clock signal CLK, the calculation circuit 59 recalculates the target value according to the request (REQUEST1). Specifically, the calculation circuit 59 recalculates the target value (TARGET VALUE 11) from the clock setting (CLK SET B) and the counter value (Ata) which are reset. Next, the timing generation circuit 54 waits until the counter value matches with the target value (TARGET VALUE 2) or the target value (TARGET VALUE 11).

When the counter value matches with any one of the target values, the timing generation circuit 54 notifies the relevant peripheral circuit 41 of the completion (END1 or END2) of the time measurement. For example, when the counter value matches with the target value (TARGET VALUE 2), the timing generation circuit 54 notifies the corresponding peripheral circuit 41 of the completion (END2) of the time measurement. Then, when the counter value matches with the target value (TARGET VALUE 11), the timing generation circuit 54 notifies the corresponding peripheral circuit 41 of the completion (END1) of the time measurement.

Figure 27:
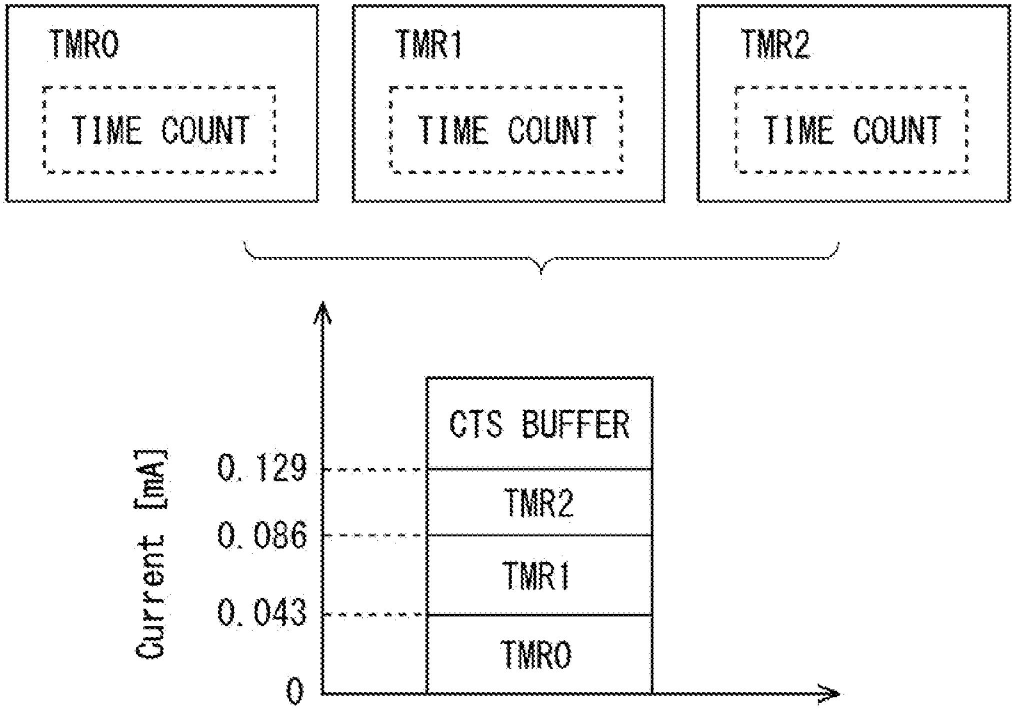
FIG. 27 is a graph illustrating a consumption current in time measurement in the semiconductor device according to the comparative example, in which the abscissa indicates a configuration in which components which consume current are stacked and the ordinate indicates the consumption current.
Figure 28:
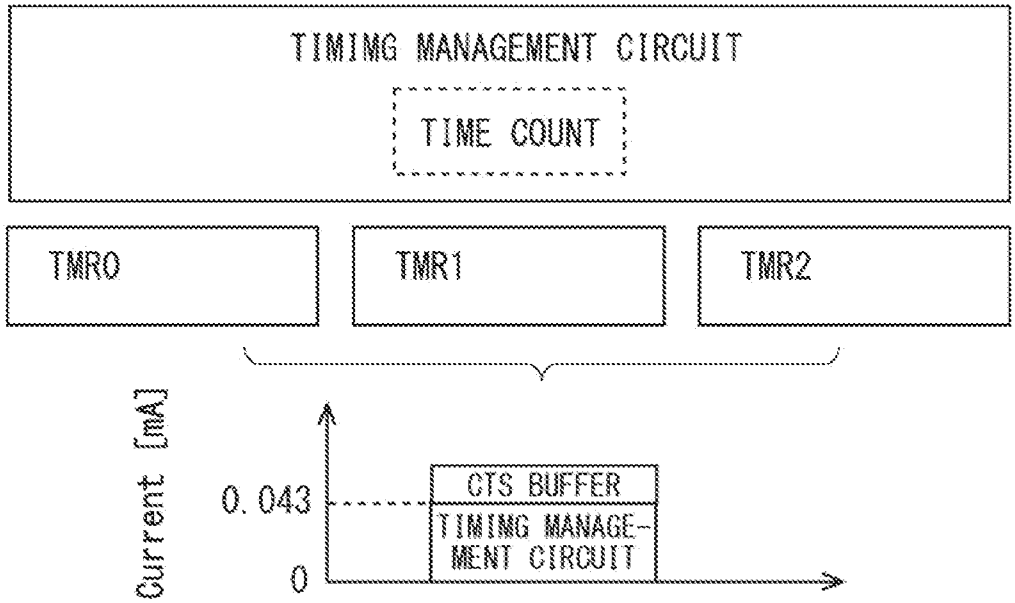
FIG. 28 is a graph illustrating a consumption current in time measurement in the semiconductor device according to the first embodiment, in which the abscissa indicates a configuration in which components which consume current are stacked and the ordinate indicates the consumption current.

Next, effects of the present embodiment will be described. FIG. 27 is a graph illustrating a consumption current in time measurement in the semiconductor device 101 according to the a comparative example, in which the abscissa indicates configuration in which components which consume current are stacked and the ordinate indicates the consumption current. FIG. 28 is a graph illustrating a consumption current in time measurement in the semiconductor device 1 according to the first embodiment, in which the abscissa indicates a configuration in which components which consume current are stacked and the ordinate indicates the consumption current.

As illustrated in FIG. 27, in the semiconductor device 101 according to the comparative example, a time measurement function provided in each of the plurality of timers 30 including a timer TMR0, a timer TMR1, and a timer TMR2 executes time measurement individually. As a result, consumption current in the semiconductor device 101 becomes a current amount obtained by adding a clock tree synthesis (CTS) buffer current to 0.129 mA which is the consumption currents to be consumed by the timer TMR0, the timer TMR1, and the timer TMR2.

In contrast, as illustrated in FIG. 28, in the semiconductor device 1 according to the present embodiment, time measurement in the plurality of timers 30 including the timer TMR0, the timer TMR1, and the timer TMR2 is executed by the timing management circuit 50. Hence, since the plurality of peripheral circuits 41 need not execute time measurement, it is possible to reduce the consumption current consumed in time measurement. For example, the consumption current in the semiconductor device 1 becomes the current amount obtained by adding the CTS buffer current to 0.043 mA which is the consumption current consumed by the timing management circuit 50.

In addition, it is possible to reduce a supply destination to which the clock signal is supplied, and accordingly, a current consumed in a transmission path of the clock signal CLK can be reduced. Moreover, it is possible to reduce a distribution amount in which the clock signal CLK for time measurement is distributed. Hence, it is possible to simplify a transmission system of the clock signal CLK. As a result, a timing design can be facilitated, thereby achieving reduction of the CTS buffer, that is, reduction in operation current in the clock generation circuit 20.

For example, the semiconductor device 101 according to the comparative example has, as the peripheral circuits, seven circuits PWM and three circuits UART. The circuits PWM and the circuits UART each have the function of executing time measurement. The consumption current of one circuit PWM is, for example, 0.18 mA, and the consumption current of one circuit UART is, for example, 0.15 mA. In consideration of this, in the semiconductor device 101 according to the comparative example, the consumption current for operating the circuits PWM and the circuits UART is $0.18\times7+0.15\times3=1.71$ mA.

Meanwhile, the semiconductor device 1 according to the present embodiment has, as the peripheral circuit, not only seven circuits PWM and three circuits UART, but also the timing management circuit 50 which executes time measurement. Also, the timing management circuit 50 has a time measurement function for the circuits PWM and the circuits UART. Assuming that the consumption current of the time measurement among the consumption currents of the circuits PWM and the circuits UART is set to be substantially 70%, the consumption current of the time measurement in the circuits PWM and the circuits UART becomes $1.71\times0.7=1.20$ mA. Hence, the consumption current consumed by operations other than the time measurement, among the consumption currents of the circuits PWM and the circuits UART, becomes $1.71-1.20=0.51$ mA. Assuming that the consumption current of the time measurement in the timing management circuit 50 is set to be 0.1 mA, in the semiconductor device 1 according to the present embodiment, the consumption current for operating the circuits PWM and the circuits UART becomes $0.51+0.1=0.61$ mA. Thus, the semiconductor device 1 according to the present embodiment can reduce the consumption current to a great extent.

Second Embodiment

Next, a semiconductor device according to the second embodiment will be described. The semiconductor device according to the present embodiment has an independent counter for each oscillation circuit, to deal with the multi-request. In the semiconductor device 1 described above, in a case in which a clock source supplying to the counter 56 is switched to the oscillation circuit A25*a* or the oscillation circuit B25*b*, a time may be required for switching. When the multi-request frequently occurs, switching of the clock signal CLK and the counter operation may not be followed with each other. In view of this, in the present embodiment, to prevent such multi-request from occurring frequently, the semiconductor device has a plurality of counters so as not to generate switching time of the clock signal CLK.

Figure 29:
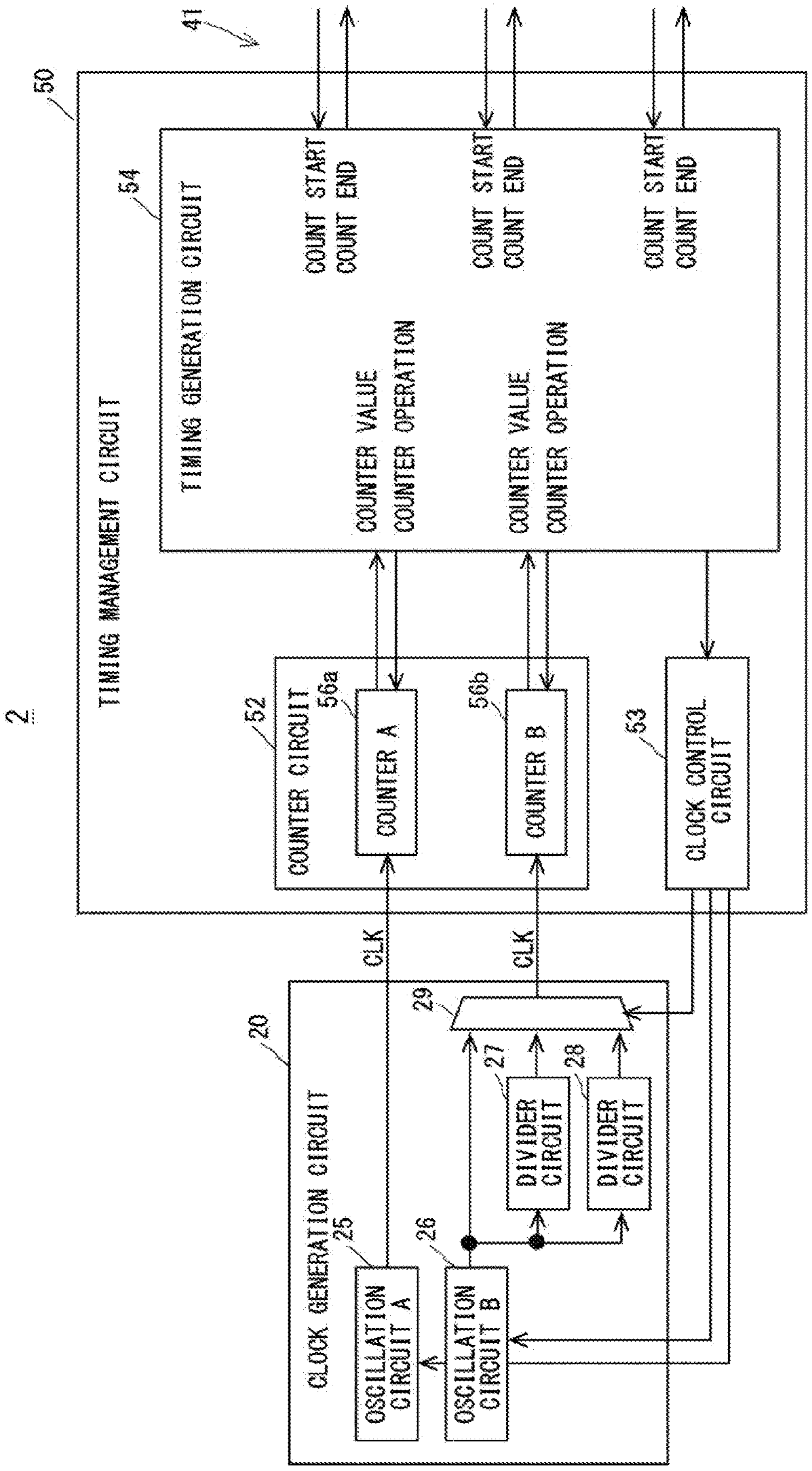
FIG. 29 is a block diagram illustrating a semiconductor device according to a second embodiment.

FIG. 29 is a block diagram illustrating a semiconductor device 2 according to the second embodiment. As illustrated in FIG. 29, the timing management circuit 50 in the semiconductor device 2 according to the second embodiment has a plurality of counters A56*a* and B56*b*. The counters A56*a* and B56*b* each execute time measurement with use of the clock signal CLK. The timing generation circuit 54 selects which one of the counters A56*a* and B56*b* to use for each request for time measurement made by the peripheral circuit 41. The clock control circuit 53 selects the clock signal CLK to be used in the counters A56*a* and B56*b* according to the peripheral circuit 41 which has made the request for the time measurement. The clock control circuit 53 may select different clock signals CLK for each of the counters A56*a* and B56*b*.

With this configuration, a switching time required in the case of switching the clock signal CLK can be reduced. Hence, even if the multi-request frequently occurs, it is possible to cause switching of the clock signal CLK and the counter operation to be followed with each other. In addition, the timing management circuit 50 according to the present embodiment can also eliminate an occurrence of an error in measurement time due to switching of an asynchronous clock signal CLK.

Third Embodiment

Figure 30:
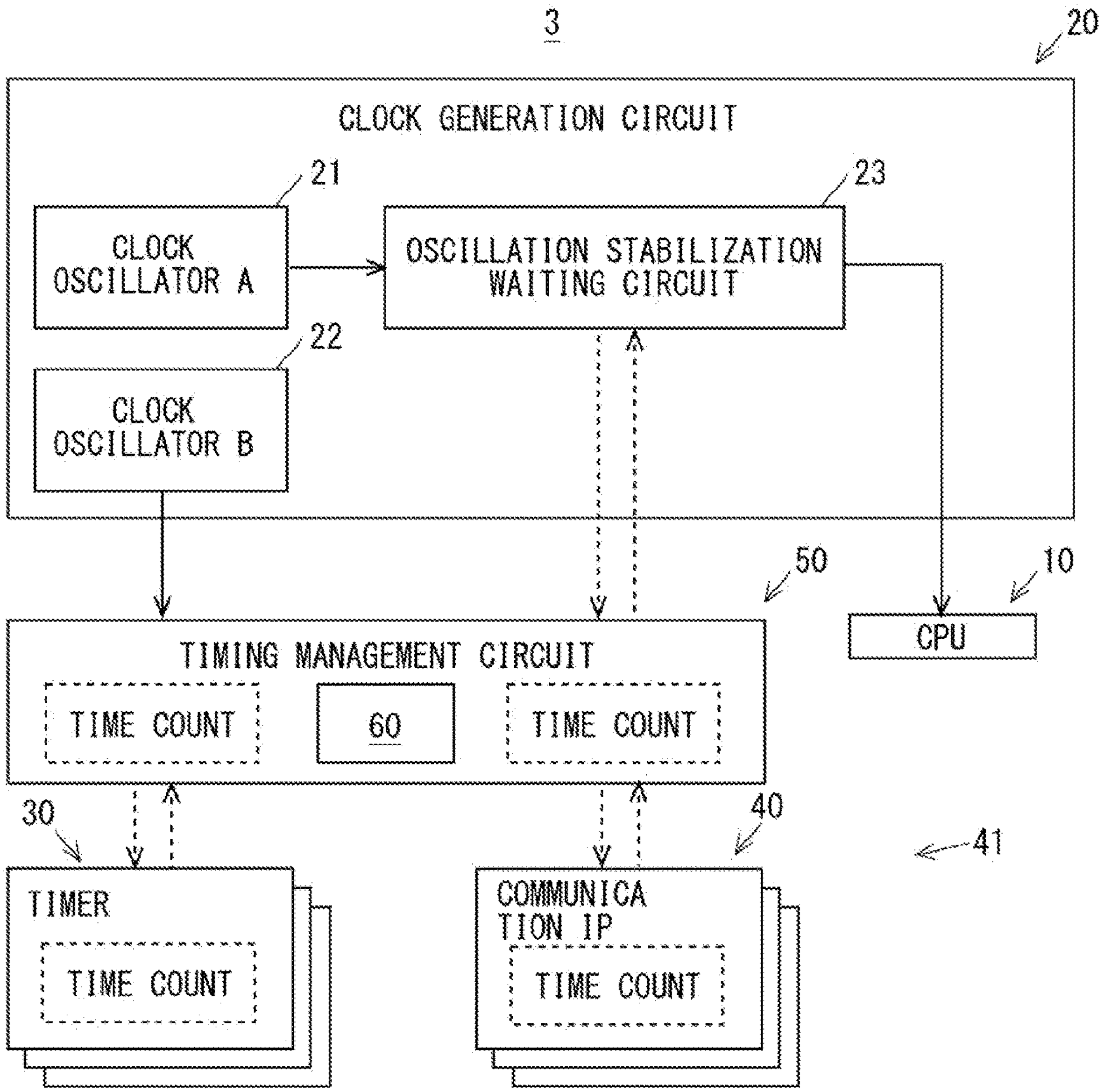
FIG. 30 is a block diagram illustrating an arithmetic processing unit, a clock generation circuit, a timer, a peripheral circuit, and a timing management circuit in a semiconductor device according to a third embodiment.

Next, a semiconductor device according to the third embodiment will be described. In the semiconductor device according to the present embodiment, for example, in place of the timing management circuit 50, the peripheral circuit 41 has the function of executing time measurement. FIG. 30 is a block diagram illustrating an arithmetic processing unit 10, a clock generation circuit 20, a timer 30, a communication IP 40, and a timing management circuit 50 in a semiconductor device 3 according to the third embodiment.

As illustrated in FIG. 30, in the semiconductor device 3 according to the present embodiment, the timing management circuit 50 has a counter circuit 52 whose number of requests for time measurement to be executable is a limited number, and the peripheral circuit 41 such as the communication IP 40 also has a counter function of executing time measurement, such as a counter circuit, disposed therein. Then, the timing management circuit 50 has a determination section 60 which determines a request for time measurement from the peripheral circuit 41 is enabled. The determination section 60 receives the request for the time measurement from the peripheral circuit 41, in a case in which the counter circuit 52 of the timing management circuit 50 only can operate. Accordingly, the counter circuit disposed in the peripheral circuit 41 does not operate.

In contrast, in at least either one of a case in which time measurement being executed is not continued or a case in which the number of requests for time measurement to be measurable simultaneously exceeds the maximum, the determination section 60 rejects the request for time measurement from the peripheral circuit 41. In a case in which the determination section 60 rejects the request, the determination section 60 causes the peripheral circuit 41 to execute time measurement with use of the counter function of the peripheral circuit 41. For example, in a case in which a plurality of requests for time measurement occur simultaneously and the time measurement cannot be executed in the timing management circuit 50, the determination section 60 causes the counter circuit and the like which are disposed in the peripheral circuit 41 to be operated. The effect of reduction in consumption current becomes small; however, the operation of the time measurement in the semiconductor device 3 can be continued.

Note that the case in which the timing management circuit 50 cannot execute time measurement is not limited to a case in which the plurality of requests for the time measurement occur simultaneously and then exceed an allowable range of the timing management circuit 50. For example, the case in which the timing management circuit 50 cannot execute time measurement may include a case in which, when the clock signal CLK is switched, time measurement in operation cannot be continued accurately. In addition, a case in which the timing management circuit 50 cannot execute time measurement may include a point of time at which a condition in which requests for time measurement cannot be received simultaneously due to a format of an interface I/F between the timing management circuit 50 and the peripheral circuit 41 is satisfied.

In the foregoing, the disclosure made by the inventor of the present disclosure has been concretely described based on the embodiments. However, it is needless to say that the present disclosure is not limited to the foregoing embodiments and various modifications and alterations can be made within the scope of the present disclosure. For example, as described below, a time measurement program causing a computer to execute a time measurement method is also included within the scope of the technical ideas of the first to third embodiments. The storage device 12 may store pieces of processing performed by respective components of the semiconductor device 1 in a form of a program. The arithmetic processing unit 10 may cause such a program to be read from the storage device 12 into a memory, so that the relevant program may be executed. As such, the arithmetic processing unit 10 achieves the functions of the respective components of the timing management circuit 50.

The time measurement program may be stored in a computer readable non-transitory storage medium or a tangible storage medium. For purposes of illustration and not limitation, a computer readable non-transitory storage medium or a tangible storage medium includes a random-access memory (RAM), a read-only memory (ROM), a flash memory, a solid-state drive (SSD), or other memory techniques, a CD-ROM, a digital versatile disc (DVD), a Blu-ray (registered trademark) disc, or other optical disc storages, a magnetic cassette, a magnetic tape, a magnetic disc storage, or other magnetic storage devices. The time measurement program may be transmitted on a computer readable temporary storage medium or on a communication medium. For purposes of illustration and not limitation, the computer readable temporary storage medium or the communication medium includes an electric signal, an optical signal, an acoustic signal, or other forms of transmission signals.

Supplementary Note A1

A time measurement method in a semiconductor device including

- an arithmetic processing unit,
- a plurality of peripheral circuits which are controlled by the arithmetic processing unit, and
- a timing management circuit which outputs a result of time measurement executed according to a request for the time measurement from each of the peripheral circuits to the peripheral circuit, the method including:
- a step of causing the timing management circuit to execute the time measurement according to each request for the time measurement.

Supplementary Note A2

The time measurement method according to Supplementary Note A1,

- in which the step of causing the timing management circuit to execute the time measurement includes
  - a step of, when a first request for a first time measurement is received from any one of the plurality of the peripheral circuits, starting the first time measurement, and
  - a step of, when a second request for a second time measurement is received during execution of the first time measurement, starting the second time measurement, while continuing to execute the first time measurement.

Supplementary Note A3

The time measurement method according to Supplementary Note A2,

- in which the semiconductor device further includes a clock generation circuit which generates a clock signal serving as a reference for the time measurement in the timing management circuit, and
- in which the step of causing the timing management circuit to execute the time measurement includes a step of executing the first time measurement and the second time measurement on a basis of the same clock signal generated in the clock generation circuit, when executing the first time measurement and the second time measurement.

Supplementary Note A4

The time measurement method according to Supplementary Note A1,

- in which the step of causing the timing management circuit to execute the time measurement includes
  - a step of executing the time measurement by receiving the request for the time measurement from the peripheral circuit, and
  - a step of stopping the time measurement until a next request is received after outputting all of the results of the time measurement of the received requests.

Supplementary Note A5

The time measurement method according to Supplementary Note A2, in which the semiconductor device further includes a clock generation circuit which generates a clock signal serving as a reference for the time measurement in the timing management circuit, in which the clock generation circuit includes a first oscillation circuit which generates a first clock signal, a second oscillation circuit which generates a second clock signal different from the first clock signal, a divider circuit which generates a third clock signal by dividing the second clock signal, and a selection circuit which selects the clock signal to be used for the time measurement, from among a plurality of the clock signals including the first clock signal, the second clock signal, and the third clock signal, according to the request, and in which the step of causing the timing management circuit to execute the time measurement includes a step of controlling selection of the clock signal in the selection circuit, and a step of executing, when executing the first time measurement and the second time measurement, the first time measurement and the second time measurement on a basis of the clock signals different from each other.

Supplementary Note A6

The time measurement method according to Supplementary Note A5, in which the step of causing the timing management circuit to execute the time measurement includes a step of controlling generation and stop of the first clock signal in the first oscillation circuit as well as generation and stop of the second clock signal in the second oscillation circuit.

Supplementary Note A7

The time measurement method according to Supplementary Note A1, in which a clock signal includes a signal which repeats between a high voltage state and a low voltage state, and in which the step of causing the timing management circuit to execute the time measurement includes a step of receiving the request for the time measurement from each of the peripheral circuits, a step of calculating, from a measurement time at which the request has been received in the time measurement and the clock signal, a target count number of the measurement time as a target value, a step of storing the target value, a step of holding a count number obtained by counting the number of the high voltage states or the low voltage states of the clock signal as a counter value, a step of comparing the counter value with the target value, and a step of outputting, in a case in which the counter value matches with the target value, the result of the time measurement to the peripheral circuit.

Supplementary Note A8

The time measurement method according to Supplementary Note A1, in which the step of causing the timing management circuit to execute the time measurement includes a step of selecting a clock signal on a basis of the peripheral circuit making the request for the time measurement, and a step of executing a plurality of the time measurements with use of the clock signal, and in which, in the selecting the clock signal, the clock signal different from one another for each of the time measurements is selected.

Supplementary Note A9

The time measurement method according to Supplementary Note A1, in which the step of causing the timing management circuit to execute the time measurement includes a step of determining whether the request for the time measurement from the peripheral circuit is enabled, and a step of rejecting the request for the time measurement from the peripheral circuit, in at least either one of a case in which the time measurement being executed is not continued or a case in which the number of requests for the time measurement to be measurable simultaneously exceeds a maximum.

Supplementary Note A10

The time measurement method according to Supplementary Note A9, in which the peripheral circuit has a counter function of executing the time measurement, and the method further including a step of causing the peripheral circuit to execute the time measurement with use of the counter function of the peripheral circuit, when the request is rejected.

Supplementary Note A11

The time measurement method according to Supplementary Note A7, in which the peripheral circuit is a timer, and in which the step of causing the timing management circuit to execute the time measurement includes a step of converting the counter value, when the request for the time measurement is received from the timer, and a step of outputting the converted counter value to the timer.

Supplementary Note B1

A time measurement program in a semiconductor device including an arithmetic processing unit, a plurality of peripheral circuits which are controlled by the arithmetic processing unit, and a timing management circuit which outputs a result of time measurement executed according to a request for the time measurement from each of the peripheral circuits to the peripheral circuit, the program causing a computer to execute:

a step of causing the timing management circuit to execute the time measurement according to each request for the time measurement.

Supplementary Note B2

The time measurement program according to Supplementary Note B1, in which the step of causing the timing management circuit to execute the time measurement includes a step of, when a first request for a first time measurement is received from any one of the plurality of the peripheral circuits, starting the first time measurement, and a step of, when a second request for a second time measurement is received during execution of the first time measurement, starting the second time measurement, while continuing to execute the first time measurement.

Supplementary Note B3

The time measurement program according to Supplementary Note B2, in which the semiconductor device further includes a clock generation circuit which generates a clock signal serving as a reference for the time measurement in the timing management circuit, and in which the step of causing the timing management circuit to execute the time measurement includes a step of executing the first time measurement and the second time measurement on a basis of the same clock signal generated in the clock generation circuit, when executing the first time measurement and the second time measurement.

Supplementary Note B4

The time measurement program according to Supplementary Note B1, in which the step of causing the timing management circuit to execute the time measurement includes a step of executing the time measurement by receiving the request for the time measurement from the peripheral circuit, and a step of stopping the time measurement until a next request is received after outputting all of the results of the time measurement of the received requests.

Supplementary Note B5

The time measurement program according to Supplementary Note B2, in which the semiconductor device further includes a clock generation circuit which generates a clock signal serving as a reference for the time measurement in the timing management circuit, in which the clock generation circuit includes a first oscillation circuit which generates a first clock signal, a second oscillation circuit which generates a second clock signal different from the first clock signal, a divider circuit which generates a third clock signal by dividing the second clock signal, and a selection circuit which selects the clock signal to be used for the time measurement, from among a plurality of the clock signals including the first clock signal, the second clock signal, and the third clock signal, according to the request, and in which the step of causing the timing management circuit to execute the time measurement includes a step of controlling selection of the clock signal in the selection circuit, and a step of executing, when executing the first time measurement and the second time measurement, the first time measurement and the second time measurement on a basis of the clock signals different from each other.

Supplementary Note B6

The time measurement program according to Supplementary Note B5, in which the step of causing the timing management circuit to execute the time measurement includes a step of controlling generation and stop of the first clock signal in the first oscillation circuit as well as generation and stop of the second clock signal in the second oscillation circuit.

Supplementary Note B7

The time measurement program according to Supplementary Note B1, in which a clock signal includes a signal which repeats between a high voltage state and a low voltage state, and in which the step of causing the timing management circuit to execute the time measurement includes a step of receiving the request for the time measurement from each of the peripheral circuits, a step of calculating, from a measurement time at which the request has been received in the time measurement and the clock signal, a target count number of the measurement time as a target value, a step of storing the target value, a step of holding a count number obtained by counting the number of the high voltage states or the low voltage states of the clock signal as a counter value, a step of comparing the counter value with the target value, and a step of outputting, in a case in which the counter value matches with the target value, the result of the time measurement to the peripheral circuit.

Supplementary Note B8

The time measurement program according to Supplementary Note B1, in which the step of causing the timing management circuit to execute the time measurement includes a step of selecting a clock signal on a basis of the peripheral circuit making the request for the time measurement, and a step of executing a plurality of the time measurements with use of the clock signal, and in which, in the selecting the clock signal, the clock signal different from one another for each of the time measurements is selected.

Supplementary Note B9

The time measurement program according to Supplementary Note B1, in which the step of causing the timing management circuit to execute the time measurement includes a step of determining whether the request for the time measurement from the peripheral circuit is enabled, and a step of rejecting the request for the time measurement from the peripheral circuit, in at least either one of a case in which the time measurement being executed is not continued or a case in which the number of requests for the time measurement to be measurable simultaneously exceeds a maximum.

Supplementary Note B10

The time measurement program according to Supplementary Note B9, in which the peripheral circuit has a counter function of executing the time measurement, and the method further including a step of causing the peripheral circuit to execute the time measurement with use of the counter function of the peripheral circuit, when the request is rejected.

Supplementary Note B11

The time measurement program according to Supplementary Note B7, in which the peripheral circuit is a timer, and in which the step of causing the timing management circuit to execute the time measurement includes a step of converting the counter value, when the request for the time measurement is received from the timer, and a step of outputting the converted counter value to the timer.

What is claimed is:

1. A semiconductor device comprising:

a central processing unit;

a plurality of peripheral circuits which are controlled by the central processing unit; and a timing management circuit which outputs a result of time measurement executed according to a request for the time measurement from each of the peripheral circuits to the peripheral circuit, wherein the timing management circuit executes the time measurement according to each request for the time measurement, wherein a clock signal includes a signal which repeats between a high voltage state and a low voltage state, wherein the timing management circuit has a timing generation circuit which receives the request for the time measurement from each of the peripheral circuits and outputs the result of the time measurement to the peripheral circuit, and a counter circuit which holds a count number obtained by counting the number of the high voltage states or the low voltage states of the clock signal as a counter value, and wherein the timing generation circuit has a calculation circuit which calculates, from a measurement time at which the request has been received in the time measurement and the clock signal, a target count number of the measurement time as a target value, a storage unit which stores the target value, and a comparator which compares the counter value with the target value.

2. The semiconductor device according to claim 1, wherein, when the timing management circuit receives a first request for a first time measurement from any one of the plurality of the peripheral circuits, the timing management circuit starts the first time measurement, and wherein, when the timing management circuit receives a second request for a second time measurement during execution of the first time measurement, the timing management circuit starts the second time measurement, while continuing to execute the first time measurement.

3. The semiconductor device according to claim 2, further comprising a clock generation circuit which generates a clock signal serving as a reference for the time measurement in the timing management circuit, wherein the timing management circuit executes the first time measurement and the second time measurement on a basis of the same clock signal generated in the clock generation circuit, when executing the first time measurement and the second time measurement.

4. The semiconductor device according to claim 1, wherein the timing management circuit executes the time measurement by receiving the request for the time measurement from the peripheral circuit, and wherein the timing management circuit stops the time measurement until it receives a next request after outputting all of the results of the time measurement of the received requests.

5. The semiconductor device according to claim 2, further comprising a clock generation circuit which generates a clock signal serving as a reference for the time measurement in the timing management circuit, wherein the clock generation circuit includes a first oscillation circuit which generates a first clock signal, a second oscillation circuit which generates a second clock signal different from the first clock signal, a divider circuit which generates a third clock signal by dividing the second clock signal, and a selection circuit which selects the clock signal to be used for the time measurement, from among a plurality of the clock signals including the first clock signal, the second clock signal, and the third clock signal, according to the request, wherein the timing management circuit has a clock control circuit which controls selection of the clock signal in the selection circuit, and wherein, when executing the first time measurement and the second time measurement, the timing management circuit executes the first time measurement and the second time measurement on a basis of the clock signals different from each other.

6. The semiconductor device according to claim 5, wherein the clock control circuit controls generation and stop of the first clock signal in the first oscillation circuit as well as generation and stop of the second clock signal in the second oscillation circuit.

7. The semiconductor device according to claim 1, wherein the timing management circuit has a plurality of counters which execute the time measurement with use of a clock signal, and a clock control circuit which selects the clock signal to be used in the counter on a basis of the peripheral circuit making the request for the time measurement, and wherein the clock control circuit selects the clock signals different from each other to each of the counters.

8. The semiconductor device according to claim 1, wherein the timing management circuit determines whether the request for the time measurement from the peripheral circuit is enabled, and wherein, in at least either one of a case in which the time measurement being executed is not continued or a case in which the number of requests for the time measurement to be measurable simultaneously exceeds a maximum, the timing management circuit rejects the request for the time measurement from the peripheral circuit.

9. The semiconductor device according to claim 8, wherein the peripheral circuit has a counter function of executing the time measurement, and wherein, when rejecting the request, the timing management circuit causes the peripheral circuit to execute the time measurement with use of the counter function of the peripheral circuit.

10. The semiconductor device according to claim 1, wherein the peripheral circuit is a timer, wherein the timing management circuit has a counter value converter which converts the counter value, and wherein, when receiving the request for the time measurement from the timer, the counter value converter outputs the converted counter value to the timer.

11. A time measurement method in a semiconductor device including a central processing unit, a plurality of peripheral circuits which are controlled by the central processing unit, a timing management circuit which outputs a result of time measurement executed according to a request for the time measurement from each of the peripheral circuits to the peripheral circuit, the method comprising:

executing, by the timing management circuit, the time measurement according to each request for the time measurement, wherein a clock signal includes a signal which repeats between a high voltage state and a low voltage state, and wherein execution of the time measurement includes receiving the request for the time measurement from each of the peripheral circuits, calculating, from a measurement time at which the request has been received in the time measurement and the clock signal, a target count number of the measurement time as a target value, storing the target value, holding a count number obtained by counting the number of the high voltage states or the low voltage states of the clock signal as a counter value, comparing the counter value with the target value, and outputting, in a case in which the counter value matches with the target value, the result of the time measurement to the peripheral circuit.

12. The time measurement method according to claim 11, the execution of the time measurement includes:

when a first request for a first time measurement is received from any one of the plurality of the peripheral circuits, starting the first time measurement, and when a second request for a second time measurement is received during execution of the first time measurement, starting the second time measurement, while continuing to execute the first time measurement.

13. The time measurement method according to claim 12, wherein the semiconductor device further includes a clock generation circuit which generates a clock signal serving as a reference for the time measurement in the timing management circuit, and wherein the execution of the time measurement includes executing the first time measurement and the second time measurement on a basis of the same clock signal generated in the clock generation circuit, when executing the first time measurement and the second time measurement.

14. The time measurement method according to claim 11, wherein execution of the time measurement includes:

executing the time measurement by receiving the request for the time measurement from the peripheral circuit, and stopping the time measurement until a next request is received after outputting all of the results of the time measurement of the received requests.

15. The time measurement method according to claim 12, wherein the semiconductor device further includes a clock generation circuit which generates a clock signal serving as a reference for the time measurement in the timing management circuit, wherein the clock generation circuit includes a first oscillation circuit which generates a first clock signal, a second oscillation circuit which generates a second clock signal different from the first clock signal, a divider circuit which generates a third clock signal by dividing the second clock signal, and a selection circuit which selects the clock signal to be used for the time measurement, from among a plurality of the clock signals including the first clock signal, the second clock signal, and the third clock signal, according to the request, and wherein the execution of the time measurement includes controlling selection of the clock signal in the selection circuit, and executing, when executing the first time measurement and the second time measurement, the first time measurement and the second time measurement on a basis of the clock signals different from each other.

16. The time measurement method according to claim 15, wherein the execution of the time measurement includes a step of controlling generation and stop of the first clock signal in the first oscillation circuit as well as generation and stop of the second clock signal in the second oscillation circuit.

17. The time measurement method according to claim 11, wherein the execution of the time measurement includes selecting a clock signal on a basis of the peripheral circuit making the request for the time measurement, and executing a plurality of the time measurements with use of the clock signal, and wherein, in the selecting the clock signal, the clock signal different from one another for each of the time measurements is selected.

18. A non-transitory computer-readable storage medium storing a time measurement program for a semiconductor device, the semiconductor device including a central processing unit, a plurality of peripheral circuits which are controlled by the central processing unit, and a timing management circuit which outputs a result of time measurement executed according to a request for the time measurement from each of the peripheral circuits to the peripheral circuit, the time measurement program causing a computer to:

cause the timing management circuit to execute the time measurement according to each request for the time measurement, wherein a clock signal includes a signal which repeats between a high voltage state and a low voltage state, and wherein execution of the time measurement includes receiving the request for the time measurement from each of the peripheral circuits, calculating, from a measurement time at which the request has been received in the time measurement and the clock signal, a target count number of the measurement time as a target value, storing the target value, holding a count number obtained by counting the number of the high voltage states or the low voltage states of the clock signal as a counter value, comparing the counter value with the target value, and outputting, in a case in which the counter value matches with the target value, the result of the time measurement to the peripheral circuit.

* * * * *